US011263717B2

(12) United States Patent
Yoggi et al.

(10) Patent No.: US 11,263,717 B2
(45) Date of Patent: *Mar. 1, 2022

(54) SINGLE SECURE ENVIRONMENT SESSION GENERATING MULTIPLE INDICIA

(71) Applicant: Stamps.com, El Segundo, CA (US)

(72) Inventors: Pradipe Yoggi, Sylmar, CA (US); Dennis Lanning Dias, Woodland Hills, CA (US); Grigoriy Arutyunyan, Los Angeles, CA (US)

(73) Assignee: Stamps.com Inc., El Segundo, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/456,768

(22) Filed: Jun. 28, 2019

(65) Prior Publication Data

US 2019/0325547 A1 Oct. 24, 2019

Related U.S. Application Data

(63) Continuation of application No. 14/255,713, filed on Apr. 17, 2014, now Pat. No. 10,417,728.

(51) Int. Cl.
*G06Q 50/32* (2012.01)
*G06Q 20/38* (2012.01)
(52) U.S. Cl.
CPC .......... *G06Q 50/32* (2013.01); *G06Q 20/382* (2013.01); *G06Q 2250/05* (2013.01)
(58) Field of Classification Search
CPC .................................................... G06Q 20/50

(Continued)

(56) References Cited

U.S. PATENT DOCUMENTS 3,584,696 A 6/1971 Eblowitz
3,594,727 A 7/1971 Braun
(Continued)

FOREIGN PATENT DOCUMENTS

CA 2470371 A1 5/2003
EP 0137737 A2 4/1985
(Continued)

OTHER PUBLICATIONS

Ford, C., "Frequent Flyer Programs," Australian Accountant, 63,1, Feb. 1993, pp. 52-58, 7 pages.
(Continued)

*Primary Examiner* — Chinedu C Agwumezie
(74) *Attorney, Agent, or Firm* — Norton Rose Fulbright US LLP

(57) ABSTRACT

Systems and methods which are adapted to generate multiple indicia in a single secure environment session are described. Embodiments provide for generation of a plurality of postage indicia in a single postage security device (PSD) transaction, whereby the PSD loads and unloads corresponding virtual PSD information a single time for generating the plurality of postage indicia (i.e., in a single secure environment session). The indicia generated in a same secure environment session according to embodiments of the invention may comprise a plurality of indicia requested by a same, single user. Additionally or alternatively, the indicia generated in the same secure environment session may comprise a plurality of indicia requested by multiple different users.

23 Claims, 6 Drawing Sheets

(58) Field of Classification Search
USPC .......................................................... 705/408
See application file for complete search history.

(56) References Cited

U.S. PATENT DOCUMENTS

| | | |
|---|---|---|
| 3,691,726 A | 9/1972 | Stephens et al. |
| 4,119,194 A | 10/1978 | Freeman et al. |
| 4,253,158 A | 2/1981 | McFiggans |
| 4,376,299 A | 3/1983 | Rivest |
| 4,511,793 A | 4/1985 | Racanelli |
| 4,641,347 A | 2/1987 | Clark et al. |
| 4,725,718 A | 5/1988 | Sansone et al. |
| 4,743,747 A | 5/1988 | Fougere et al. |
| 4,744,554 A | 5/1988 | Kulpa et al. |
| 4,757,537 A | 7/1988 | Edelmann et al. |
| 4,763,271 A | 8/1988 | Field |
| 4,775,246 A | 10/1988 | Edelmann et al. |
| 4,800,508 A | 1/1989 | Axelrod et al. |
| 4,802,218 A | 1/1989 | Wright et al. |
| 4,812,994 A | 3/1989 | Taylor et al. |
| 4,831,554 A | 5/1989 | Storace et al. |
| 4,831,555 A | 5/1989 | Sansone et al. |
| 4,837,701 A | 6/1989 | Sansone et al. |
| 4,858,138 A | 8/1989 | Talmadge |
| 4,864,618 A | 9/1989 | Wright et al. |
| 4,868,757 A | 9/1989 | Gil |
| 4,873,645 A | 10/1989 | Hunter et al. |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,941,091 A | 7/1990 | Breault et al. |
| 5,058,008 A | 10/1991 | Schumacher |
| 5,065,000 A | 11/1991 | Pusic et al. |
| 5,067,088 A | 11/1991 | Schneiderhan |
| 5,075,862 A | 12/1991 | Doeberl et al. |
| 5,077,792 A | 12/1991 | Herring |
| 5,085,470 A * | 2/1992 | Peach ................... G06Q 30/02 229/92.8 |
| 5,111,030 A | 5/1992 | Brasington et al. |
| 5,150,407 A | 9/1992 | Chan |
| 5,202,834 A | 4/1993 | Gilham |
| 5,222,018 A | 6/1993 | Sharpe et al. |
| 5,233,657 A | 8/1993 | Gunther |
| 5,237,506 A | 8/1993 | Horbal et al. |
| 5,239,168 A | 8/1993 | Durst, Jr. et al. |
| 5,289,540 A | 2/1994 | Jones |
| 5,319,562 A | 6/1994 | Whitehouse |
| 5,323,323 A | 6/1994 | Gilham |
| 5,323,465 A | 6/1994 | Avarne |
| 5,341,505 A | 8/1994 | Whitehouse |
| 5,423,573 A | 6/1995 | de Passille |
| 5,454,038 A | 9/1995 | Cordery et al. |
| 5,483,445 A | 1/1996 | Pickering |
| 5,485,369 A | 1/1996 | Nicholls et al. |
| 5,490,077 A | 2/1996 | Freytag |
| 5,510,992 A | 4/1996 | Kara |
| 5,583,779 A | 12/1996 | Naclerio et al. |
| 5,602,743 A | 2/1997 | Freytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,619,571 A | 4/1997 | Sandstrom et al. |
| 5,623,546 A | 4/1997 | Hardy et al. |
| 5,649,118 A | 7/1997 | Carlisle et al. |
| 5,655,023 A | 8/1997 | Cordery et al. |
| 5,663,547 A | 9/1997 | Ziarno |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |
| 5,717,597 A | 2/1998 | Kara |
| 5,729,459 A | 3/1998 | Brandien et al. |
| 5,729,460 A | 3/1998 | Plett et al. |
| 5,729,674 A | 3/1998 | Rosewarne et al. |
| 5,742,683 A | 4/1998 | Lee et al. |
| 5,768,132 A | 6/1998 | Cordery et al. |
| 5,774,886 A | 6/1998 | Kara |
| 5,778,076 A | 7/1998 | Kara et al. |
| 5,796,834 A | 8/1998 | Whitney et al. |
| 5,801,364 A | 9/1998 | Kara et al. |
| 5,801,944 A | 9/1998 | Kara |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,860,068 A | 1/1999 | Cook |
| 5,923,885 A | 7/1999 | Johnson et al. |
| 5,936,885 A | 8/1999 | Morita et al. |
| 5,946,671 A | 8/1999 | Herring |
| 5,960,418 A | 9/1999 | Kelly et al. |
| 5,983,209 A | 11/1999 | Kara |
| 6,005,945 A | 12/1999 | Whitehouse |
| 6,010,069 A | 1/2000 | Debois |
| 6,047,273 A | 4/2000 | Vaghi |
| 6,061,670 A | 5/2000 | Brand |
| 6,061,671 A | 5/2000 | Baker et al. |
| 6,175,825 B1 | 1/2001 | Fruechtel |
| 6,199,055 B1 | 3/2001 | Kara et al. |
| 6,208,980 B1 | 3/2001 | Kara |
| 6,233,565 B1 | 5/2001 | Lewis et al. |
| 6,233,568 B1 | 5/2001 | Kara |
| 6,249,777 B1 | 6/2001 | Kara et al. |
| 6,385,504 B1 | 5/2002 | Pintsov et al. |
| 6,430,543 B1 | 8/2002 | Lee et al. |
| 6,470,327 B1 | 10/2002 | Carroll et al. |
| 6,532,452 B1 | 3/2003 | Pintsov et al. |
| 6,834,273 B1 | 12/2004 | Sansone et al. |
| 6,853,990 B1 | 2/2005 | Thiel |
| 6,865,557 B1 | 3/2005 | Cordery et al. |
| 7,149,726 B1 | 12/2006 | Lingle et al. |
| 7,182,259 B2 | 2/2007 | Lubow et al. |
| 7,225,170 B1 | 5/2007 | Ryan, Jr |
| 7,266,531 B2 | 9/2007 | Pintsov et al. |
| 7,337,152 B1 | 2/2008 | Gawler |
| 7,343,357 B1 | 3/2008 | Kara |
| 7,409,353 B1 | 8/2008 | Uslontsev et al. |
| 7,444,290 B2 | 10/2008 | Woods et al. |
| 7,458,612 B1 | 12/2008 | Bennett |
| 7,509,291 B2 | 3/2009 | McBride et al. |
| 7,548,612 B2 | 6/2009 | Weissman et al. |
| 7,711,650 B1 | 5/2010 | Kara |
| 7,778,924 B1 | 8/2010 | Ananda |
| 7,784,090 B2 | 8/2010 | Lord et al. |
| 7,831,518 B2 | 11/2010 | Montgomery et al. |
| 7,831,824 B2 | 11/2010 | Abdulhayoglu |
| 7,840,492 B2 | 11/2010 | Leung et al. |
| 7,882,042 B2 | 2/2011 | Meyer et al. |
| 7,954,709 B1 | 6/2011 | Leon et al. |
| 7,963,437 B1 | 6/2011 | McBride et al. |
| 8,027,927 B2 | 9/2011 | Ogg et al. |
| 8,027,935 B1 * | 9/2011 | Begen ................... G06Q 20/28 705/401 |
| 8,041,644 B2 | 10/2011 | Ogg et al. |
| 8,046,823 B1 | 10/2011 | Begen et al. |
| 8,100,324 B1 | 1/2012 | Leon |
| 8,204,835 B1 | 6/2012 | Ogg |
| 8,240,579 B1 | 8/2012 | Bennett |
| 8,600,910 B2 | 12/2013 | Kara et al. |
| 8,612,361 B1 | 12/2013 | Bussell et al. |
| 8,626,673 B1 | 1/2014 | Bennett |
| 8,775,331 B1 | 7/2014 | Tsuie et al. |
| 9,208,620 B1 | 12/2015 | Bortnak et al. |
| 9,761,061 B1 | 9/2017 | Bussell et al. |
| 9,824,380 B1 | 11/2017 | Chowdhary et al. |
| 9,922,302 B2 | 3/2018 | Gventer et al. |
| 9,978,185 B1 | 5/2018 | Bortnak et al. |
| 10,373,398 B1 | 8/2019 | McBride et al. |
| 10,417,728 B1 * | 9/2019 | Yoggi ................. G07B 17/00024 |
| 2001/0007086 A1 | 7/2001 | Rogers et al. |

(56) References Cited

U.S. PATENT DOCUMENTS

| | | |
|---|---|---|
| 2001/0020234 A1 | 9/2001 | Shah et al. |
| 2001/0022060 A1 | 9/2001 | Robertson et al. |
| 2001/0042052 A1 | 11/2001 | Leon |
| 2002/0032573 A1 | 3/2002 | Williams et al. |
| 2002/0032668 A1 | 3/2002 | Kohler et al. |
| 2002/0032784 A1 | 3/2002 | Darago et al. |
| 2002/0052841 A1 | 5/2002 | Guthrie et al. |
| 2002/0065577 A1 | 5/2002 | Teraura et al. |
| 2002/0073050 A1 | 6/2002 | Gusler et al. |
| 2002/0082935 A1 | 6/2002 | Moore et al. |
| 2002/0095347 A1 | 7/2002 | Cummiskey |
| 2002/0099652 A1 | 7/2002 | Herzen et al. |
| 2002/0116318 A1 | 8/2002 | Thomas et al. |
| 2002/0143431 A1 | 10/2002 | Sansone |
| 2003/0009425 A1 | 1/2003 | Stonedahl et al. |
| 2003/0029914 A1 | 2/2003 | Hortman et al. |
| 2003/0037008 A1 | 2/2003 | Raju et al. |
| 2003/0065739 A1 | 4/2003 | Shnier |
| 2003/0080182 A1 | 5/2003 | Gunther |
| 2003/0101143 A1 | 5/2003 | Montgomery et al. |
| 2003/0101148 A1 | 5/2003 | Montgomery et al. |
| 2003/0130963 A1 | 7/2003 | Stickler et al. |
| 2003/0138345 A1 | 7/2003 | Schwabe |
| 2003/0167241 A1 | 9/2003 | Gilham |
| 2003/0182155 A1 | 9/2003 | Nitzan et al. |
| 2003/0187666 A1 | 10/2003 | Leon |
| 2003/0204477 A1 | 10/2003 | McNett |
| 2003/0217018 A1 | 11/2003 | Groff et al. |
| 2003/0233276 A1 | 12/2003 | Pearlman et al. |
| 2003/0236709 A1 | 12/2003 | Hendra et al. |
| 2004/0002926 A1 | 1/2004 | Coffy et al. |
| 2004/0048503 A1 | 3/2004 | Mills et al. |
| 2004/0064422 A1 | 4/2004 | Leon |
| 2004/0083179 A1 | 4/2004 | Sesek et al. |
| 2004/0083189 A1 | 4/2004 | Leon |
| 2004/0089482 A1 | 5/2004 | Ramsden et al. |
| 2004/0122776 A1 | 6/2004 | Sansone |
| 2004/0122779 A1 | 6/2004 | Stickler et al. |
| 2004/0128264 A1 | 7/2004 | Leung et al. |
| 2004/0185827 A1 | 9/2004 | Parks |
| 2004/0185882 A1 | 9/2004 | Gecht et al. |
| 2004/0186811 A1 | 9/2004 | Gullo et al. |
| 2004/0212833 A1 | 10/2004 | Taskett et al. |
| 2004/0215581 A1 | 10/2004 | Lord et al. |
| 2004/0215583 A1 | 10/2004 | Elliott |
| 2004/0230544 A1 | 11/2004 | Herbert |
| 2004/0254808 A1 | 12/2004 | Bennett et al. |
| 2005/0065892 A1 | 3/2005 | Ryan et al. |
| 2005/0065896 A1 | 3/2005 | Kummer et al. |
| 2005/0065897 A1 | 3/2005 | Ryan et al. |
| 2005/0071244 A1 | 3/2005 | Phillips et al. |
| 2005/0080751 A1 | 4/2005 | Burningham |
| 2005/0114222 A1 | 5/2005 | Mundy |
| 2005/0116047 A1 | 6/2005 | Lu et al. |
| 2005/0119786 A1 | 6/2005 | Kadaba |
| 2005/0171791 A1 | 8/2005 | Chimenti et al. |
| 2005/0171869 A1 | 8/2005 | Minnocci |
| 2005/0192899 A1 | 9/2005 | Reardon |
| 2005/0209913 A1 | 9/2005 | Wied et al. |
| 2005/0237203 A1 | 10/2005 | Burman et al. |
| 2005/0256811 A1 | 11/2005 | Pagel et al. |
| 2005/0278266 A1 | 12/2005 | Ogg et al. |
| 2006/0000648 A1 | 1/2006 | Galtier |
| 2006/0020505 A1 | 1/2006 | Whitehouse |
| 2006/0122947 A1 | 6/2006 | Poulin |
| 2006/0173700 A1 | 8/2006 | Fenelon |
| 2006/0173796 A1 | 8/2006 | Kara |
| 2006/0220298 A1 | 10/2006 | Fairweather et al. |
| 2006/0259390 A1 | 11/2006 | Rosenberger |
| 2006/0282271 A1 | 12/2006 | Ananda et al. |
| 2006/0283943 A1 | 12/2006 | Ostrowski et al. |
| 2007/0033110 A1 | 2/2007 | Philipp et al. |
| 2007/0073587 A1 | 3/2007 | Walker et al. |
| 2007/0078795 A1 | 4/2007 | Chatte |
| 2007/0080228 A1 | 4/2007 | Knowles et al. |
| 2007/0174213 A1 | 7/2007 | Whitehouse et al. |
| 2007/0174215 A1 | 7/2007 | Morel |
| 2007/0255664 A1 | 11/2007 | Blumberg et al. |
| 2008/0154781 A1 | 6/2008 | Kumar |
| 2008/0169343 A1 | 7/2008 | Skaaksrud et al. |
| 2008/0281719 A1 | 11/2008 | Hall et al. |
| 2009/0164392 A1 | 6/2009 | Raju et al. |
| 2009/0172084 A1 | 7/2009 | Lavanya et al. |
| 2009/0259513 A1 | 10/2009 | Tung et al. |
| 2009/0265585 A1 | 10/2009 | Ikegami |
| 2010/0169241 A1 | 7/2010 | Schoonmaker et al. |
| 2010/0235267 A1 | 9/2010 | Brookner et al. |
| 2010/0298662 A1 | 11/2010 | Yu et al. |
| 2010/0312627 A1 | 12/2010 | Khechef et al. |
| 2011/0015935 A1 | 1/2011 | Montgomery et al. |
| 2011/0022544 A1 | 1/2011 | Kim et al. |
| 2011/0029429 A1 | 2/2011 | Whitehouse |
| 2011/0071944 A1 | 3/2011 | Heiden et al. |
| 2011/0145107 A1 | 6/2011 | Greco |
| 2011/0225180 A1 | 9/2011 | Liao et al. |
| 2011/0242554 A1 | 10/2011 | Farry et al. |
| 2011/0295646 A1 | 12/2011 | Barros |
| 2012/0008766 A1 | 1/2012 | Robertson et al. |
| 2012/0054754 A1 | 3/2012 | Teichmann et al. |
| 2012/0109777 A1 | 5/2012 | Lipsitz et al. |
| 2012/0159603 A1 | 6/2012 | Queck |
| 2012/0233252 A1 | 9/2012 | Vats et al. |
| 2012/0240204 A1 | 9/2012 | Bhatnagar et al. |
| 2013/0056533 A1 | 3/2013 | Zimberoff et al. |
| 2013/0061337 A1 | 3/2013 | Zimberoff et al. |
| 2013/0066794 A1 | 3/2013 | Hill et al. |
| 2013/0254132 A1 | 9/2013 | Srinath et al. |
| 2014/0019517 A1 | 1/2014 | Fawcett |
| 2014/0067665 A1 | 3/2014 | Paletz et al. |
| 2014/0265300 A1 | 9/2014 | Jena |
| 2014/0324633 A1 | 10/2014 | Pollak et al. |
| 2021/0081890 A1 | 3/2021 | Atwood et al. |

FOREIGN PATENT DOCUMENTS

| | | |
|---|---|---|
| EP | 0571259 A1 | 11/1993 |
| EP | 0927958 A2 | 7/1999 |
| EP | 0927963 A2 | 7/1999 |
| EP | 1785856 A2 | 5/2007 |
| FR | 2580844 A1 | 10/1986 |
| GB | 2251210 A | 7/1992 |
| JP | 04284558 B2 | 10/1992 |
| JP | 2000-105845 A | 4/2000 |
| WO | WO-88/01818 A1 | 3/1988 |
| WO | WO-97/40472 A1 | 10/1997 |
| WO | WO-98/14907 A2 | 4/1998 |
| WO | WO-98/14909 A2 | 4/1998 |
| WO | WO-98/57302 A1 | 12/1998 |
| WO | WO-98/57460 A1 | 12/1998 |
| WO | WO-02/083517 A2 | 8/2002 |
| WO | WO-02/093498 A2 | 11/2002 |
| WO | WO-03/039051 A2 | 5/2003 |
| WO | WO-03/083784 A1 | 10/2003 |

OTHER PUBLICATIONS

Alexander, K.L., "U.S. Stamps Pay Tribute to Starry-Eyed Jurors," Final Edition, Calgary Herald, Calgary, Alberta, Canada, Sep. 14, 2007, 2 pages.

Non-Final Office Action dated Aug. 3, 2009 for U.S. Appl. No. 11/353,690 to Kara, filed Feb. 14, 2006, and entitled "System and Method for Validating Postage," 19 pages.

"Domestic Mail Manual Section 604," United States Postal Service, Aug. 31, 2005, 45 pages.

"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.

Mobile Postage Stamps via Text Messages Announced, Phone Reviews, Mobile Phones, News, Mar. 11, 2011, pp. 1-3.

Anonymous, "Automated Indicia Detection System From Parascript Protects Postage Revenue for Postal Operators, Cracks Down on

(56) References Cited

OTHER PUBLICATIONS

Fraud:—Parascript StampVerify Simplifies Complex Task of Automatically Locating and Verifying Different Types of Indicia on Envelope Images-," PR Newswire, New York, Sep. 18, 2007, 2 pages.
Davies, Brad L. "Printing System for Preventing Injustice by Delivering Print Data from Postal Charge Meter to Printer," Jan. 2001, 1 page.
Unpublished U.S. Appl. No. 11/509,309 to Leon filed Aug. 24, 2006 and entitled "Invisible Fluorescent Ink Mark," 15 pages.
Unpublished U.S. Appl. No. 11/323,463 to Leon et al. filed Dec. 30, 2005 and entitled "Systems and Methods for Single Pass Printing Postage Indicia," 23 pages.
Unpublished U.S. Appl. No. 10/606,579 to Ogg, filed Jun. 26, 2003 and entitled "System and Method for Automatically Processing Mail," 15 pages.
International Search Report and Written Opinion issued for PCT Application No. PCT/US2017/020662, dated May 19, 2017, 14 pages.
International Search Report issued for PCT/US95/00237, dated May 29, 1995, 4 pages.
Grabara, J. et al. "The Role of Information Systems in Transport Logistics" International Journal of Education and Research, vol. 2, No. 2, Feb. 2014, 8 pages.

* cited by examiner

SINGLE SECURE ENVIRONMENT SESSION GENERATING MULTIPLE INDICIA

CROSS-REFERENCE TO RELATED APPLICATIONS

The present application is a continuation of co-pending, commonly assigned, U.S. patent application Ser. No. 14/255,713 entitled "SINGLE SECURE ENVIRONMENT SESSION GENERATING MULTIPLE INDICIA," filed Apr. 17, 2014, which itself is related to co-pending and commonly assigned U.S. patent application Ser. No. 12/316,542 entitled "Computer-Based Value-Bearing Item Customization Security," filed Dec. 11, 2008, Ser. No. 14/055,473 entitled "Systems and Methods Facilitating Shipping Services Rate Resale" filed Oct. 16, 2013, the disclosures of which are hereby incorporated herein by reference.

TECHNICAL FIELD

The invention relates generally to generating indicia, such as value bearing indicia, and more particularly to using a single security device secure environment session to generate multiple indicia.

BACKGROUND OF THE INVENTION

Various forms of value bearing indicia have been developed and used throughout the world. Such value bearing indicia often takes the form of an electronic and/or printed data packet adapted for providing a representation of value sufficient to be acceptable as proof of payment for goods, services, etc. For example, postage indicia have been used for a number of years as proof of payment for postal services.

Because such indicia represents a form of value, the indicia itself and the process for its generation is typically provided some form of security. For example, the indicia may implement digital signatures, secure hash techniques, cryptographic techniques, etc. The process for generating the indicia may be performed within a secure environment, such as within the confines of a secure processor-based system (e.g., cryptocard, such as the 4764 cryptographic coprocessor available from International Business Machines Corporation). For example, postage indicia, such as the information based indicia (IBI) generated by processor-based open systems (e.g., stand-alone or client/server general purpose systems operable under control of an instruction set providing postage indicia metering functionality) in accordance with the United States Postal Service (USPS), may be generated within a postal security device (PSD) and may include digital signatures generated by a cryptographic processor of the PSD.

In order to perform as an indicia generation device, such secure environments must typically be loaded with the requisite indicia generation host information, perform the steps for generation of the indicia, and subsequently have the indicia generation host information unloaded from the secure environment to free the secure environment for other operations (e.g., generation of indicia for different users, for different accounts, for different uses, etc.). For example, in the postage indicia context, a cryptocard may be provided with indicia generation host information, such as may comprise ascending and descending postage registers, cryptographic postal keys, logging records, etc., (referred to herein as "virtual PSD information") to configure the otherwise "generic" cryptocard as a particular PSD (e.g., a specific user's PSD, a PSD for a specific postage account, etc.) for use in generating an indicia. Once the indicia has been generated, the virtual PSD information with its updated data (e.g., register values) reflecting generation of the indicia may be offloaded from the cryptocard and stored in a database for subsequent use. Because the virtual PSD information contains the information establishing the cryptocard as the PSD (i.e., the PSD "personality"), this PSD information is generally encrypted when passed outside of the secure environment of the cryptocard.

As can be appreciated from the foregoing, considerable data transfer and processing may be associated with the generation of indicia. In particular, not only must the virtual PSD information be retrieved and loaded into the secure environment of the cryptocard in the foregoing example, but the virtual PSD information must be decrypted once loaded prior to use. Correspondingly, the virtual PSD information must again be encrypted once the indicia is generated prior to offloading of the virtual PSD information from the cryptocard. This processing and data transfer is in addition to that directly associated with the generation of the indicia itself, including the cryptographic functions typically employed to provide a digital signature. In order to provide the requisite logging and register value accountability, the process must be repeated for each indicia generated according to the present implementations.

Some use scenarios may provide a situation in which a user is in need of or otherwise desires to generate a plurality of indicia in a same session. For example, a user may desire to generate a plurality of postage indicia, such as to provide a supply of postage indicia for some period of time (e.g., a week or month). Such scenarios have not traditionally been the focus of service by the processor-based open systems used in generating IBI. However, as can be appreciated from the foregoing, where such processor-based systems utilizing virtual PSD information as described above can require appreciable time (in computer processing terms) to load/unload the data, decrypt/encrypt the data, update the registers and logs, generate the postage indicia and repeat for each indicia generated. There is currently no solution implemented for reducing the time associated with the repeated loading/unloading data, decrypting/encrypting, updating registers and logs, and generating postage indicia required for generation of each indicia of the plurality of indicia.

Another example of a use scenario which may require appreciable time for generating a plurality of indicia is that of a multiuser postage meter, such as in the case an enterprise postage meter or a centralized postage meter serving a number of clients (e.g., remote retail kiosks, post office point of sale terminals, etc.). In such a scenario, multiple users (e.g., using different client systems) may request postage indicia generation simultaneously or in close temporal proximity. Currently available solutions for providing service to the different users has been to implement a PSD pool (i.e., a plurality of PSDs operable to each independently load virtual PSD information for separately metering and generating postage indicia) at the centralized postage meter. Although such a solution may be effective at reducing delay associated with the generation of multiple postage indicia, the solution is relatively costly and requires maintaining prepaid account balances (i.e., postage meter value balances) with respect to each such virtual PSD.

BRIEF SUMMARY OF THE INVENTION

The present invention is directed to systems and methods which are adapted to generate multiple indicia in a single secure environment session. For example, embodiments of the present invention provide for generation of a plurality of postage indicia in a single PSD transaction, whereby the PSD loads and unloads corresponding virtual PSD information a single time for generating the plurality of postage indicia (i.e., in a single secure environment session).

The indicia generated in a same secure environment session according to embodiments of the invention may comprise a plurality of indicia requested by a same, single user. For example, the multiple indicia may comprise a number of postage indicia estimated to supply the user for some period of time (e.g., a week or a month). Additionally or alternatively, the indicia generated in the same secure environment session may comprise a plurality of indicia requested by multiple different users (e.g., different users of an enterprise metering system, users of different client systems served by a metering system server, etc.).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
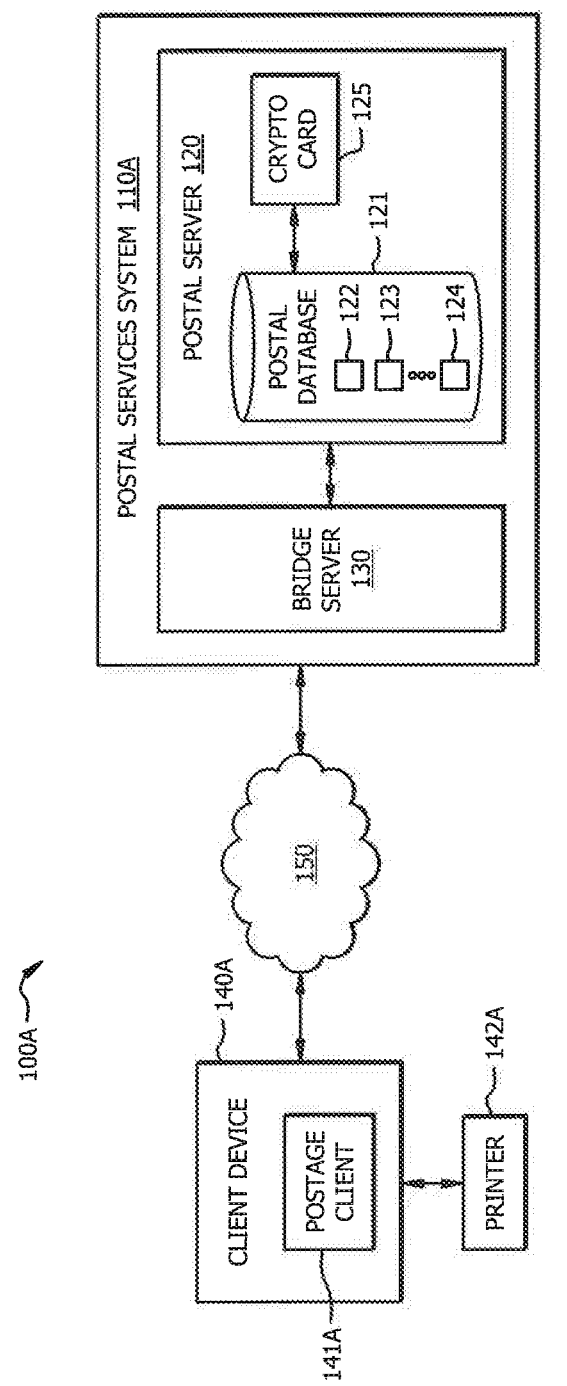
FIGS. 1A and 1B show systems adapted to provide generation of multiple indicia in a single secure environment session according to embodiments of the present invention.
Figure 1B:
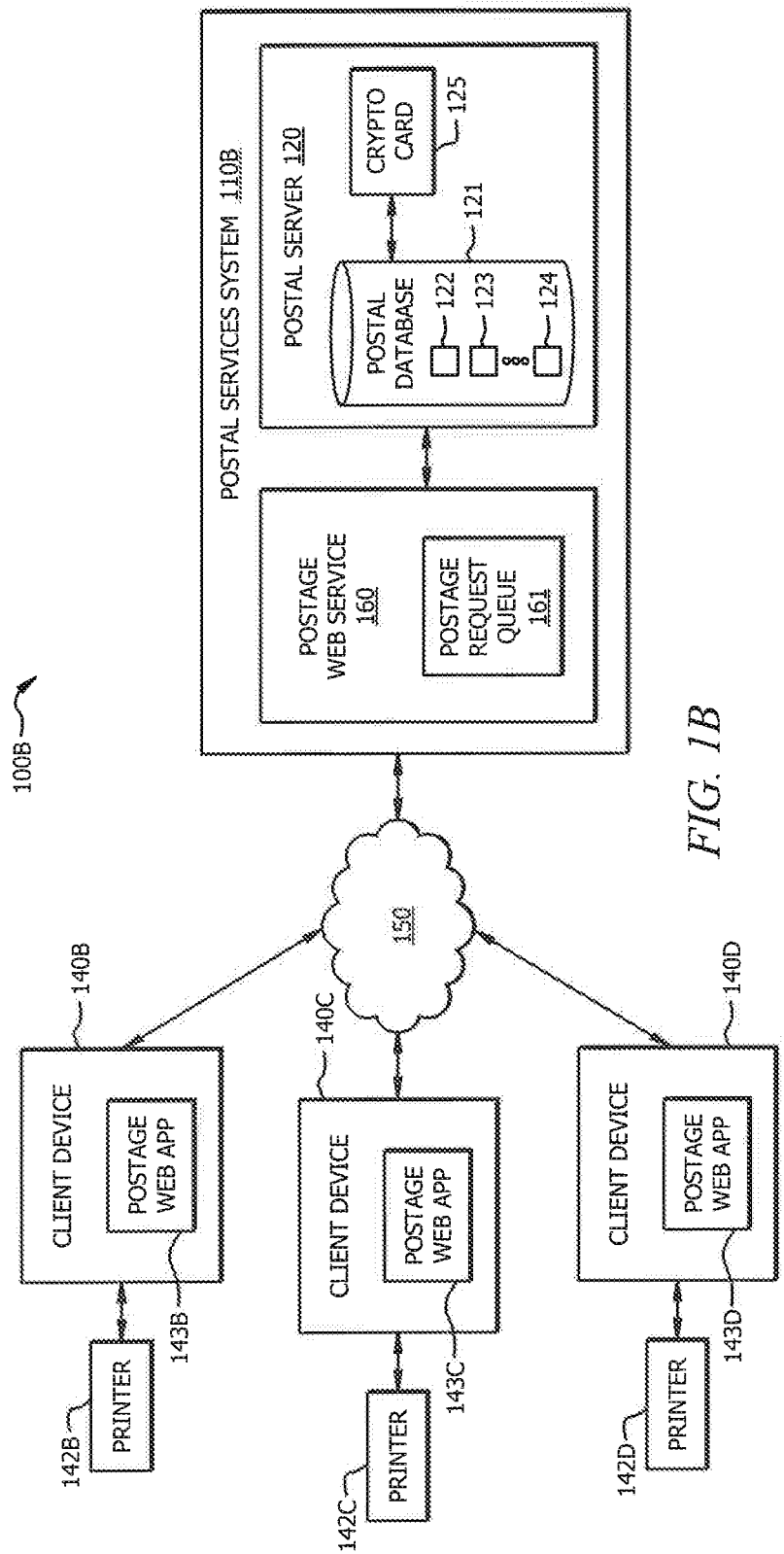

FIGS. 1A and 1B show embodiments of systems adapted to provide generation of multiple indicia in a single secure environment session. In particular, system 100A of FIG. 1A shows an exemplary embodiment operable to generate multiple indicia in a same secure environment session requested by a same, single user (e.g., the single user may comprise a single individual, multiple individuals from a same entity or source, etc.). Correspondingly, system 100B of FIGURE B shows an exemplary embodiment operable to generate multiple indicia in a same secure environment session requested by multiple different users (e.g., the multiple users may comprise multiple independent and unaffiliated users, multiple affiliated users operating independently, etc.). It should be appreciated that, although the embodiments of FIGS. 1A and 1B are described as being exemplary of a system responsive to a request for multiple indicia from a single user (system 100A) or a system responsive to requests for indicia from multiple users (system 100B), either system according to embodiments may be responsive to requests for multiple indicia from a single user and/or to requests for indicia from multiple users.

In operation according to embodiments herein, the indicia requested and generated comprises value bearing indicia (i.e., indicia representative of an amount of pecuniary value, such as may be utilized for proof of payment, payment for goods or services, etc.). In particular, the embodiments of systems 100A and 100B illustrated in FIGS. 1A and 1B are shown to be operable with respect to value bearing indicia comprising postage indicia. For example, the postage indicia requested and generated according to embodiments herein may comprise IBI, as may be generated by processor-based open systems in accordance with the USPS. It should be appreciated, however, that the concepts herein are applicable to a variety of indicia, and thus are not limited to the specific indicia of the examples described herein.

Embodiments herein operate to provide a form of security (e.g., digital signatures, secure hash, encryption, etc.) with respect to the value bearing indicia generated in order to facilitate protection of the value thereof. The process for generating the requested indicia is performed within a secure environment (e.g., as may be provided by one or more crypto modules) according to the illustrated embodiments. For example, cryptocard 125, such as may comprise the 4764 (single threaded) or 4765 (multi-threaded) cryptographic coprocessors available from International Business Machines Corporation, provides a crypto module facilitating a secure environment in which postage indicia may be generated thus providing a form of postage security device (PSD). Of course, other forms of crypto modules and other devices for providing the requisite secure environment may be utilized to provide a PSD or other secure environment in accordance with embodiments of the invention, such as smartcards, trusted platform modules (TPMs), touch memory utility buttons (TMUs), etc. Although a single cryptocard is shown in the illustrated embodiment, it should be appreciated that a plurality of such devices may be provided with respect to postal services system 110A, such as to facilitate serving a number of requests for indicia (e.g., a plurality of bulk indicia requests from the same of different users). Irrespective of the particular secure environment implementation, as will be better understood from the discussion which follows, in operation according to embodiments herein a plurality of postage indicia are generated in a single secure device session.

In providing a system adapted to provide generation of multiple indicia in a single secure environment session, system 100A of FIG. 1A comprises postal service system 110A in communication with client device 140A via network 150. Postal services system 110A is adapted to generate multiple indicia in a same secure environment session requested by a user of client device 140A. In particular, postal services system 110A is operable in response to a request for multiple postage indicia from client device 140A to initiate a single PSD transaction, whereby cryptocard 125 loads and unloads corresponding virtual PSD information (e.g., any of virtual PSD information 122-124 stored by postal database 121) a single time for generating the plurality of postage indicia.

It should be appreciated that the components of postal service system 110A may be implemented as a single system, such as a single server, or as a distributed system, such as a server farm, a number of host systems disposed remotely with respect to each other, etc. For example, postage server 120 and bridge server 130 of postal services system 110A may be hosted by a same server. Alternatively, postage server 120 and bridge server 130 may be hosted by different servers according to embodiments herein.

Irrespective of a single or distributed implementation, postal services system 110A of embodiments may comprise a processor-based system operable under control of an instruction set or instruction sets defining operation as described herein. Postal services system 110A of embodiments comprises one or more processors (e.g., a CORE or PENTIUM processor available from Intel, Inc.) and requisite processor readable (e.g., computer readable) memory (e.g., random access memory (RAM), read only memory (ROM), flash memory, disk memory, solid state drive (SSD) memory, optical memory, and/or the like) and input/output components (e.g., display, network interface card (NIC), keyboard, digital pointer, printer, and/or the like) coupled to a processor of the one or more processors via a data bus.

Postage server 120 may comprise a processor or processors and portion of the processor readable memory of postal services system 110A and corresponding instruction set operable to define postage server operation as described herein, including generation of multiple indicia in a single secure environment session. Postage server 120 of embodiments may comprise a server (e.g., web server) or servers or virtual server operable within a suitable host environment (e.g., within a postal services system server). Postage server 120 may, for example, comprise a system substantially as described with respect to the shipping service infrastructure in the above referenced patent application entitled "Systems and Methods Facilitating Shipping Services Rate Resale", adapted to provide generation of multiple postage indicia herein.

Postage server 120 of the illustrated embodiment comprises cryptocard 125 configurable as a PSD according to embodiments herein and operable to provide a secure environment in which postage indicia (and/or other desired indicia) may be securely generated. Postal database 121 of the illustrated embodiment comprises a number of data files providing virtual PSD information (shown here as virtual PST information 122-124). Virtual PSD information 122-124 of embodiments comprises information suitable for temporarily configuring cryptocard 125 as a PSD for a particular postage meter license or licenses. For example, each of virtual PSD information 122-124 may comprise ascending and descending registers, postage indicia strike registers, log files, postal account identification, meter license number, etc. utilized in postage indicia metering operations for different users or user accounts. The virtual PSD information is preferably encrypted by cryptocard 125 for storage in postal database 121 to thereby protect this data when outside the confines of a secure environment.

It should be appreciated that, although postal database 121 is shown disposed within postage server 120, the postal database may be external or remote thereto. For example, some portion of virtual PSD information may be stored in one or more database disposed locally with respect to postage server 120 while another portion of virtual PSD information may be stored in one or more database disposed remotely with respect to postage server 120.

Bridge server 130 may comprise a processor or processors and portion of the processor readable memory of postal services system 110A and corresponding instruction set operable to define bridge server operation as described herein, including user authentication, user account association/identification, etc. Bridge server 130 of embodiments may comprise a server (e.g., web server) or servers or virtual server operable within a suitable host environment (e.g., within a postal services system server). Bridge server 130 as may be utilized according to embodiments of the invention may, for example, comprise a system substantially as described in U.S. Pat. No. 8,046,823 entitled "Secure Application Bridge Server," the disclosure of which is incorporated herein by reference.

Client device 140A of embodiments herein may comprise any number of system configurations used by a user for requesting, obtaining, and/or printing desired indicia, such as postage indicia. For example, client device 140A may comprise a general purpose processor-based system (e.g., personal computer (PC) having a processor, memory, suitable input/output (I/O) functionality, and operating system (OS)) operating under control of postage client 141A providing a client application (e.g., PC client, web client, mobile client, tablet client, etc.) to interface with postal services system 110A and provide operation as described herein. Additionally or alternatively, client device 140A may comprise a processor-based device such as a smart phone, a tablet device, a personal digital assistant (PDA), an Internet appliance (e.g., a processor-based postage printer Internet appliance), etc., having the requisite instruction set (e.g., postage client 141A) and processing and I/O resources. The interface architecture implemented according to embodiments of the invention not only accommodate standalone client applications, but may support other forms of client access, such as web based applets, third party software access integration, etc. Printer 142A, such as may comprise any printer configuration (e.g., laser printer, ink jet printer, thermal printer, etc.) suitable for printing or otherwise rendering desired indicia, is coupled to client device 140A of the illustrated embodiment. It should be appreciated that although one client device is shown in FIG. 1A, any number and combination of configurations of client devices may be accommodated according to embodiments.

Network 150 provides communication links with respect to client devices and by and between components of the postal services system for facilitating requesting, generating, and/or printing of desired indicia. Accordingly, the links of network 150 are operable to provide suitable communication links for facilitating cooperative interaction and data transfer as described herein. Network 150 of embodiments may thus comprise one or more of a local area network (LAN), metropolitan area network (MAN), wide area network (WAN), wireless LAN (WLAN), the Internet, intranet, extranet, cable transmission system, cellular communication network, and/or the like.

Figure 2A:
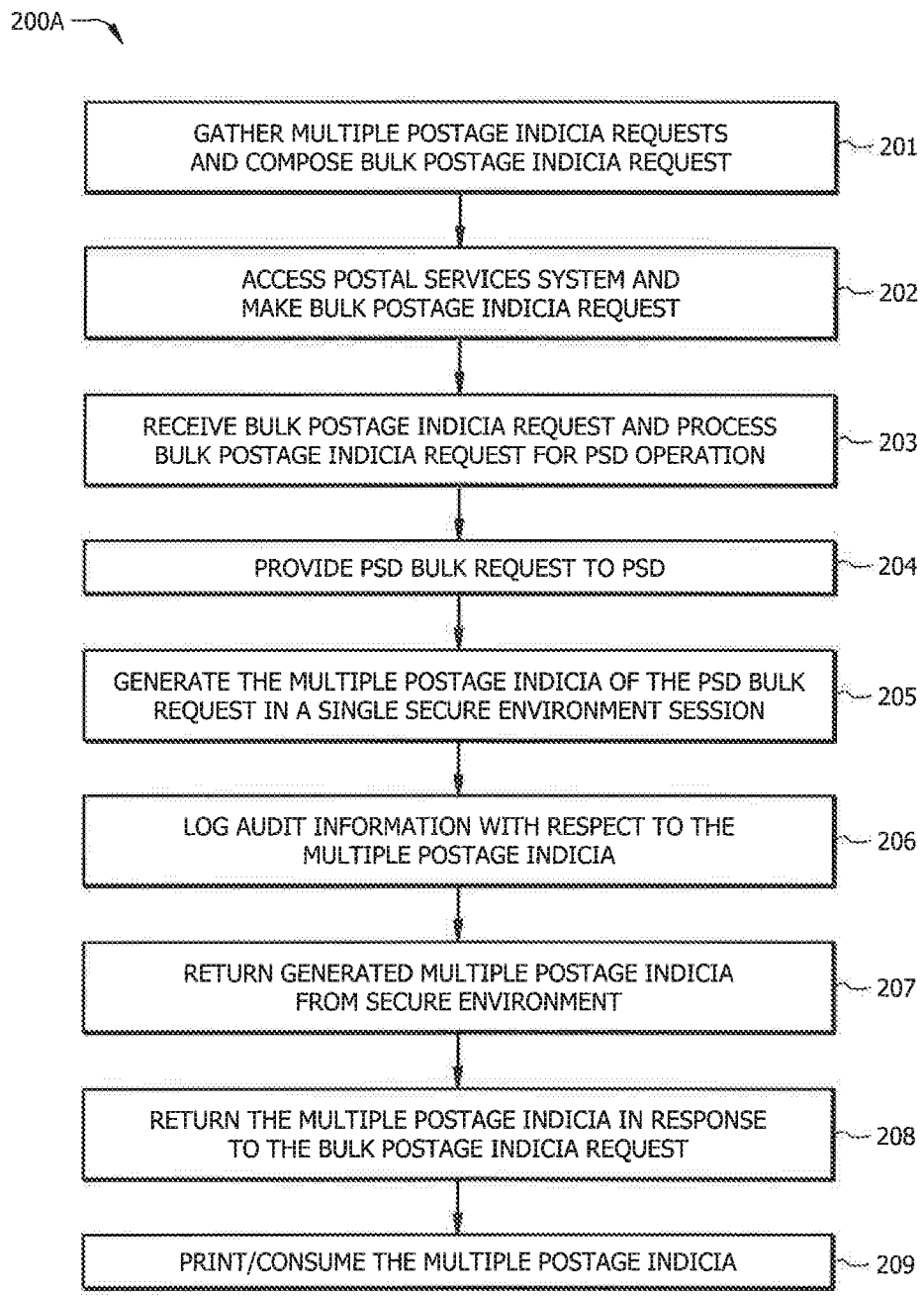
FIGS. 2A and 2B show flow diagrams of operation to provide generation of multiple indicia in a single secure environment session according to embodiments of the present invention.

Flow 200A of FIG. 2A illustrates operation of system 100A to provide generation of multiple indicia in a single secure environment session according to embodiments herein. Operation of the illustrated embodiment of flow 200A supports generating multiple indicia in a same secure environment session requested by a same, single user.

Accordingly, at block 201 postage client 141A gathers multiple postage indicia requests for the user and composes one or more bulk postage indicia requests. For example, a user may interact with postage client 141A to select a number of postage indicia to be generated, such as to provide a supply of postage indicia estimated to serve the user for a period of time. Additionally or alternatively, the user may perform various operations for which postage indicia are needed (e.g., generating one or more letters, envelopes, or other correspondence, process shipping labels, etc.) from which postage client 141A may gather postage requests, perhaps over the course of time (e.g., throughout the work day). Accordingly, the multiple postage indicia requests of the bulk postage indicia request may be part of an express desire for multiple postage indicia from the user, an aggregation of separate postage indicia needs, or a combination thereof. Irrespective of the particular impetus for the multiple postage indicia, a bulk request for such multiple postage indicia is generated according to embodiments of the invention.

A bulk postage indicia request of embodiments comprises information sufficient to generate multiple desired postage indicia for the requesting user. Accordingly, a bulk postage indicia request may include information such as postage amounts, multiple special services, mail classes, hidden postage information, insurance information, tracking numbers, etc. Moreover, bulk postage indicia requests preferably include user identification information (e.g., user account information, user credentials (e.g., user name, password, digital certificate, etc.), and/or the like), such as may be used to validate the user as an authorized user of the postal services system, to identify an account from which value for the postage indicia is to be debited and/or to which value is to be charged, to identify virtual PSD information associated with the requesting user, etc.

At block 202 of the illustrated embodiment, postal services system 110A is accessed and the bulk postage indicia request is made. For example, postage client 141A may communicate with postal services system 110A via network 150 to initiate a session for generating multiple postage indicia, such as by communicating the bulk postage indicia request and/or other information (e.g., user credentials) from client device 140A to bridge server 130. Bridge server 130 of embodiments may operate to authenticate the user, such as using user identification information of the bulk postage indicia request and/or user credentials provided therein or therewith. Such authentication may operate to identify the user as being authorized to receive the services of postal services system 110A. Additionally or alternatively, such authentication may associate the user with one or more accounts (e.g., as may be represented by corresponding ones of the PSDs of virtual PSD information 122-124) accessible to postal services system 120.

Having made the bulk postage indicia request, the bulk postage indicia request is received and processed for PSD operation at block 203 of the illustrated embodiment. For example, assuming the user authentication is successful, bridge server 130 may pass the bulk postage indicia request, or some portion thereof, to postage server 120 for generating the multiple postage indicia. In operation according to embodiments, logic of postage server 120 operates to process the bulk postage indicia request for facilitating operation by cryptocard 125 in generating multiple postage indicia in a same secure environment session. For example, postage server 120 may operate to associate the bulk postage request with particular virtual PSD information of virtual PSD information 122-124 storing postage value available to the user making the request. Additionally or alternatively, postage server 120 may provide processing of the bulk postage indicia request to provide the request, or some portion thereof, in a form usable by the PSD, such as to format the data for use by the PSD (e.g., serialize the data in a form understandable by logic of the PSD), to utilize a protocol compatible with the PSD, etc.

In operation according to embodiments, processing with respect to the bulk postage indicia request provided by logic of postal services system 110A may comprise a number of operations for facilitating postage indicia generation by cryptocard using virtual PSD information of postal database 121. For example, logic of postal services system 110A may calculate the total postage amount from the bulk postage indicia request data and determine if adequate total postage amount is available in the user PSD record for the bulk postage indicia request before acquiring a secure module (e.g., cryptocard 125) for generation of the postage indicia.

At block 204 of the illustrated embodiment a PSD bulk request (e.g., the bulk postage indicia request as processed by postal services system 110A) is provided to cryptocard 125. For example, after processing the bulk postage indicia request for facilitating operation by cryptocard 125 in generating multiple postage indicia in a same secure environment session, logic of postal services system 110A may provide the PSD bulk request to cryptocard 125 to initiate generation of the multiple postage indicia. In operation according to embodiments, providing the PSD bulk request to the cryptocard by logic of postal services system 110A may comprise a number of operations. For example, logic of postal services system 110A may operate to select a particular crypto module (e.g., cryptocard 125) for generation of the multiple postage indicia from a plurality of crypto modules (e.g., to select an available crypto module, to select a crypto module having specific capabilities, to provide load balancing among a pool of crypto modules, etc.). The selected crypto module may thereafter be locked for operation of the secure environment session to generate the multiple postage indicia.

It should be appreciated that the providing of the PSD bulk request may be done in association with providing other data to the cryptocard. For example, logic of postal services system 110A may operate to select a particular virtual PSD record for use in generating the multiple postage indicia. The virtual PSD information provided to cryptocard 125 may, for example, be selected based upon user identification, user credentials, a PSD for providing services authorized with respect to the requesting user, etc. and that the virtual PSD has sufficient account value associated therewith to support generation of the requested postage indicia. The selected virtual PSD information of virtual PSD information 122-124 may be locked (e.g., to prevent its simultaneous use with respect to another crypto module, whereby value represented thereby may be consumed more than once) and the selected virtual PSD information provided to cryptocard 125 in order to configure cryptocard 125 for operation as a particular PSD.

Further, in association with the providing of the PSD bulk request to the cryptocard, logic of postal services system 110A may acquire and lock a check point record for that crypto module (e.g., from postal database 121). The check point record may, for example, comprise information regarding the state of the crypto module after the last transaction performed by the crypto module. A postal database of embodiments may store check point records for each available crypto module. Such check point information may be utilized in providing an atomic transaction with respect to the generation of the multiple postage indicia. That is, if operation to generate the multiple postage indicia is interrupted or otherwise fails to complete the complete process of generating all the multiple postage indicia, and possibly logging information associated therewith, a check point record indicating a state of the PSD prior to initiating the postage indicia generation operation may be used to roll the PSD data back to its state prior to initiating the failed multiple postage indicia generation transaction. Such check point record information may be provided to cryptocard 125, such as with or in association with the virtual PSD information and/or PSD bulk request.

Having received the PSD bulk request according to flow 200A of the illustrated embodiment, cryptocard 125 operable as a PSD generates the multiple postage indicia of the PSD bulk request in a single secure environment session at block 205 of the illustrated embodiment. That is, cryptocard 125 of embodiments is operable to load and decrypt the appropriate virtual PSD information, configure the memory (e.g., ascending register, descending register, strike count register, etc.) of the cryptocard as the corresponding PSD, generate each postage indicia of the multiple postage indicia, update appropriate PSD data (e.g., ascending register value, descending register value, strike count register value, etc.), and encrypt the virtual PSD information for offloading from the cryptocard. In operation according to embodiments, logic of cryptocard 125 may determine the number of postage indicia it is being requested to generate (e.g., for configuring logic for an appropriate number of iterations to generate the postage indicia), determine the total value for the postage indicia to be generated (e.g., for confirming that sufficient value is available for completing the bulk postage indicia transaction), determine the size of the memory for the indicia generation based on the total number of the postage requests (e.g., for confirming that sufficient memory space is available for generation and temporary storage of the postage indicia and for allocating that memory space), and generate multiple postage indicia data (e.g., data packets from which postage indicia may be printed).

Logic of the PSD may, for example, operate to authenticate the request (e.g., as a request from a valid server or other requesting system and/or as a request from a valid user or users). Additionally or alternatively, logic of the PSD may operate to verify that sufficient value is present in the PSD for generation of the requested postage indicia. For example, the PSD logic may implement a loop in which the value for each of the multiple requested postage indicia is identified and summed to determine a total value for the requested indicia. This total value may be compared to the value available from the PSD (e.g., the PSD descending register) to determine if sufficient value is present to allow generation of the multiple requested indicia. It should be appreciated that this verification of available value by the PSD may be performed in addition to a determination by the postage server or other system external to the PSD regarding sufficient value, such as to provide a secure and/or accurate verification of sufficient value prior to generation of the requested indicia. Initiation of generation of the multiple postage indicia may be prevented if a sufficient amount of value for the total amount is not available. If, however, sufficient value is available, the logic of the PSD may again implement a loop to generate each of the requested postage indicia, storing the generated postage indicia data for providing to the postage server in a single response. In operation according to embodiments, the ascending and descending registers of the PSD are adjusted as each of the multiple postage indicia are generated. Additionally, a logging register of embodiments of the PSD is used to sum the value of each of the generated postage indicia to provide a total amount used with respect to logging data (e.g., used in generation of an audit indicia for logging purposes).

It should be appreciated that cryptocard 125 of embodiments may operate to generate more than the requested multiple postage indicia when performing operation for generating multiple postage indicia in a single secure environment session. For example, logic of the cryptocard may generate logging and/or other data unique to the secure environment multiple postage indicia session. In operation according to embodiments, such logging data may include the number of indicia generated in the session, the total value of the indicia generated, the time/date of the generation session (e.g., the starting time, the ending time, or both), the starting and/or ending register values (e.g., ascending register, descending register, etc.), transaction number or other transaction identification information, meter/license number or other identification information, and the like.

At block 206 of the illustrated embodiment, cryptocard 125 may return logging or audit information for the multiple postage indicia for processing, storage, and/or reporting by postal services system 110A. For example, after the cryptocard generates postage indicia data for a multiple postage indicia request, intermediary code for the cryptocard may operate to write an audit log entry to one or more storage device (e.g., the audit log information may be written to a postal server disk or other storage device other than postal database 121 to avoid tampering or to otherwise facilitate reliable auditing of the indicia generation transactions). Such audit information may comprise information regarding the number, value, type, etc. of the generated postage indicia, identification of the PSD (e.g., virtual PSD information) used to generate the postage indicia, and/or the like. Additionally or alternatively, such audit information may comprise one or more audit indicia, generated by cryptocard 125 in association with the multiple postage indicia, providing aggregated audit information (e.g., a transaction number or other identification information, meter/license number, the total value for all the multiple postage indicia, starting and/or ending register values, number of postage indicia generated, identification information for each of the multiple postage indicia, time stamp for the multiple indicia generation session, etc.). An audit indicium of embodiments comprises a standard indicia format (e.g., the same format as the generated postage indicia) including some or all of the above information (e.g., a 16 bit number in the range from 1 to 64 k providing transaction identification, an actual number of indicium created, and the ending ascending and descending register values). Any or all of the foregoing information may be further processed, stored, and/or reported by logic of postal services system 110A. In operation according to embodiments, after such audit log information is written successfully, logic of cryptocard 125 may provide the generated postage indicia data for the multiple postage indicia, the updated virtual PSD information, and updated check point record to logic of postal services system 110A outside of the secure environment. It should be appreciated that the indicium generated in response to the request for multiple postage indicia may be associated with the audit information (e.g., the audit indicium through matching of identification information, such as the aforementioned transaction number, meter/license number, and/or time stamp information), such as for audit purposes, validation of the indicia, etc.

Accordingly, at block 207 of the illustrated embodiment of flow 200A the generated multiple postage indicia are passed from the secure environment of cryptocard 125. For example, the generated multiple postage indicia may be returned to logic of postage server 120, such as for further processing and providing to the requesting client device. It should be appreciated that information in addition to that of the multiple postage indicia may be returned from cryptocard 125 in association with the generated postage indicia. For example, cryptocard 125 may return the virtual PSD information, updated to reflect generation of the multiple postage indicia, for storage in postal database 121.

At block 208, postal services system 110A returns the generated multiple postage indicia to the requesting client device. It should be appreciated that logic of postal services system 110A may provide further processing with respect to the generated multiple postage indicia prior to its returning the generated multiple postage indicia to client device 140A. For example, postal services system 110A may provide processing of the multiple postage indicia returned by cryptocard 125 to provide the postage indicia data, or some portion thereof, in a form usable by the requesting client device(s) or other systems of system 100A, such as to format the data for use by client device 140A and/or for processing and communication by bridge server 130. Embodiments of postal services system 110A may provide processing to associate the multiple postage indicia with the particular bulk postage indicia request made by postage client 141A in order to facilitate properly identifying the postage indicia with the operations at client device 140A for which the postage indicia was generated. Additionally or alternatively, such processing may comprise packaging the data of the generated multiple postage indicia in one or more data packets optimized or otherwise suitable for efficient communication to client device 140A via network 150.

Having received the requested multiple postage indicia, client device 140A may print or otherwise consume the multiple postage indicia at block 209. For example, postage client 141A may receive the multiple postage indicia data and generate postage indicia image data packets (e.g., bitmap images of IBI, such as may comprise human readable information and machine readable information, such as PDF 417 or data matrix barcode) suitable for controlling printer 142A to print postage indicia acceptable to a postal service or other shipping service provider.

In providing a system adapted to provide generation of multiple indicia in a single secure environment session, system 100B of FIG. 1B comprises postal service system 110B in communication with client devices 140B-140D via network 150. Postal services system 110B is adapted to operable to generate multiple indicia in a same secure environment session requested by multiple different users of client devices 140B-140D. In particular, postal services system 110B is operable in response to a request for multiple postage indicia combined from requests made by client devices 140B-140D, whereby cryptocard 125 loads and unloads corresponding virtual PSD information (e.g., any of virtual PSD information 122-124 stored by postal database 121) a single time for generating the plurality of postage indicia.

Although components of postal service system 110B (e.g., postage web service 160) may be adapted to facilitate generation of multiple postage indicia requested by different users, components of postal service system 110B (e.g., postage server 120) may be configured as described above with respect to postal service system 110A. Moreover, the components of postal service system 110B may be implemented as a single system, such as a single server, or as a distributed system, such as a server farm, a number of host systems disposed remotely with respect to each other, etc. For example, postage server 120 and postage web service 160 of postal services system 110B may be hosted by a same server. Alternatively, postage server 120 and postage web service 160 may be hosted by different servers according to embodiments herein.

Irrespective of a single or distributed implementation, as with postal services system 110A described above, postal services system 110B of embodiments may comprise a processor-based system operable under control of an instruction set or instruction sets defining operation as described herein. Accordingly, postal services system 110B of embodiments comprises one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus.

Postage server 120 of postal services system 110B of embodiments is configured as described above with respect to postal services system 110A. Accordingly, postage server 120 may comprise a processor-based system, including cryptocard 125 configurable as a PSD, in communication with postal database 121. Although postal database 121 is shown disposed within postage server 120, it should be appreciated that the postal database may be external or remote thereto.

Postage web server 160 may comprise a processor or processors and portion of the processor readable memory of postal services system 110B and corresponding instruction set operable to define postage web server operation as described herein, including queuing user requests for postage indicia, grouping postage indicia requests, composing bulk postage indicia requests, parsing/assigning generated postage indicia to the appropriate requesting user, etc. Postage web server 160 of embodiments may comprise a server (e.g., web server) or servers or virtual server operable within a suitable host environment (e.g., within a postal services system server).

Client devices 140B-140D of embodiments herein may comprise any number of system configurations used by a user for requesting, obtaining, and/or printing desired indicia, such as postage indicia. For example, one or more of client devices 140B-140D may comprise a general purpose processor-based system (e.g., personal computer (PC) having a processor, memory, suitable input/output (I/O) functionality, and operating system (OS)) operating under control of a postage web app (e.g., a respective one of postage web apps 143B-143D) providing a client application (e.g., PC client, web client, mobile client, tablet client, etc.) to interface with postal services system 110B and provide operation as described herein. Additionally or alternatively, one or more of client devices 140B-140D may comprise a processor-based device such as a smart phone, a tablet device, a personal digital assistant (PDA), an Internet appliance (e.g., a processor-based postage printer Internet appliance), etc., having the requisite instruction set (e.g., a respective one of postage web apps 143B-143D) and processing and I/O resources. The interface architecture implemented according to embodiments of the invention not only accommodate web based applet implementations, but may support other forms of client access including standalone client applications, third party software access integration, etc. Printers 142B-142D, such as may comprise any printer configuration (e.g., laser printer, ink jet printer, thermal printer, etc.) suitable for printing or otherwise rendering desired indicia, are coupled to respective ones of client devices 140B-140D of the illustrated embodiment. It should be appreciated that although three client devices are shown in FIG. 1B, any number and combination of configurations of client devices may be accommodated according to embodiments.

As described above with respect to the embodiment of FIG. 1A, network 150 provides communication links with respect to client devices and by and between components of the postal services system for facilitating requesting, generating, and/or printing of desired indicia. Accordingly, network 150 shown in the embodiment of FIG. 1B may comprise one or more of a LAN, MAN, WAN, WLAN, the Internet, intranet, extranet, cable transmission system, cellular communication network, and/or the like.

Figure 2B:
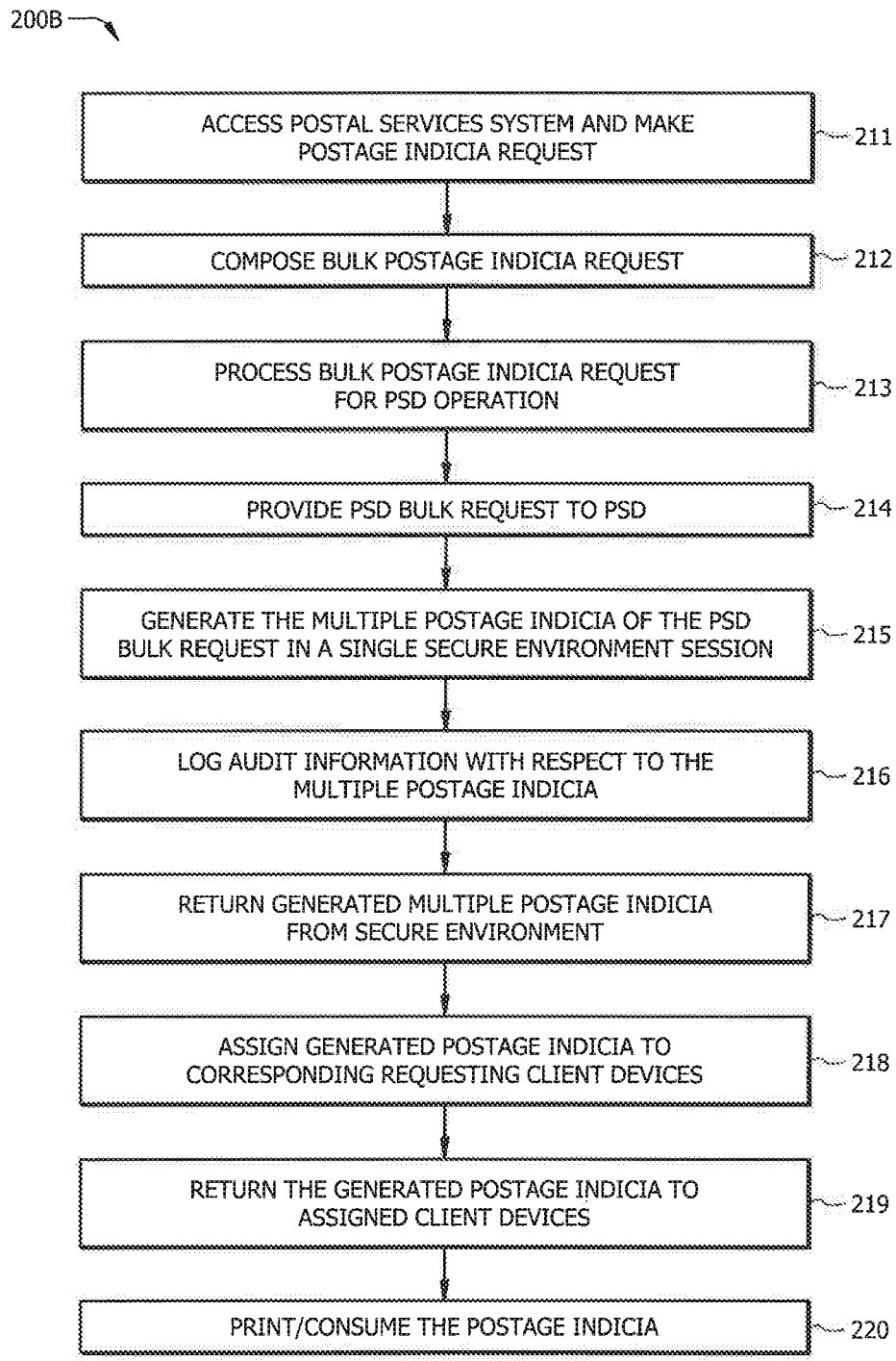

Flow 200B of FIG. 2B illustrates operation of system 100B to provide generation of multiple indicia in a single secure environment session according to embodiments herein. Operation of the illustrated embodiment of flow 200B supports generating multiple indicia in a same secure environment session requested by multiple different users. Accordingly, at block 211, postal services system 110B is accessed and desired postage indicia is requested. For example, any or all of postage web apps 143B-143D may communicate with postal services system 110B via network 150 to each request one or more postage indicia (e.g., postage web apps 143B-143D may make individual postage indicia request and/or bulk postage indicia requests for multiple postage indicia). In accessing postal services system 110B, the postage web apps may communicate their postage indicia requests and/or other information (e.g., user credentials) from a respective one of client devices 140B-140D to postage web service 160.

A postage indicia request of embodiments comprises information sufficient to generate at least one desired postage indicia for the requesting user. Accordingly, a postage indicia request may include information such as a postage amount, requested special service, mail class, hidden postage information, insurance information, tracking number, etc. Moreover, postage indicia requests preferably include user identification information (e.g., user account information, user credentials (e.g., user name, password, digital certificate, etc.), and/or the like), such as may be used to validate the user as an authorized user of the postal services system, to identify an account from which value for the postage indicia is to be debited and/or to which value is to be charged, to identify virtual PSD information associated with the requesting user, etc.

Postage web service 160 of embodiments may operate to authenticate the user, such as using user identification information of the postage indicia requests and/or user credentials provided therein or therewith. Such authentication may operate to identify the user as being authorized to receive the services of postal services system 110B. Additionally or alternatively, such authentication may associate the user with one or more accounts (e.g., as may be represented by corresponding ones of the PSDs of virtual PSD information 122-124) accessible to postal services system 120.

It should be appreciated that the requests for postage indicia made by client devices 140B-140D may be made independently of any other of the client devices, and thus may be received by postal services system 110B asynchronously, perhaps over a period of time. For example, as each client device of client devices 140B-140D is utilized by a user thereof to perform operations for which postage indicia are needed (e.g., generating one or more letters, envelopes, or other correspondence, process shipping labels, etc.), requests for postage indicia may be made to postal services system 110B. Accordingly, postage web service 160 of the illustrated embodiment comprises postage request queue 161 operable to store the requests for aggregation into one or more bulk postage request for multiple postage indicia.

Figure 3:
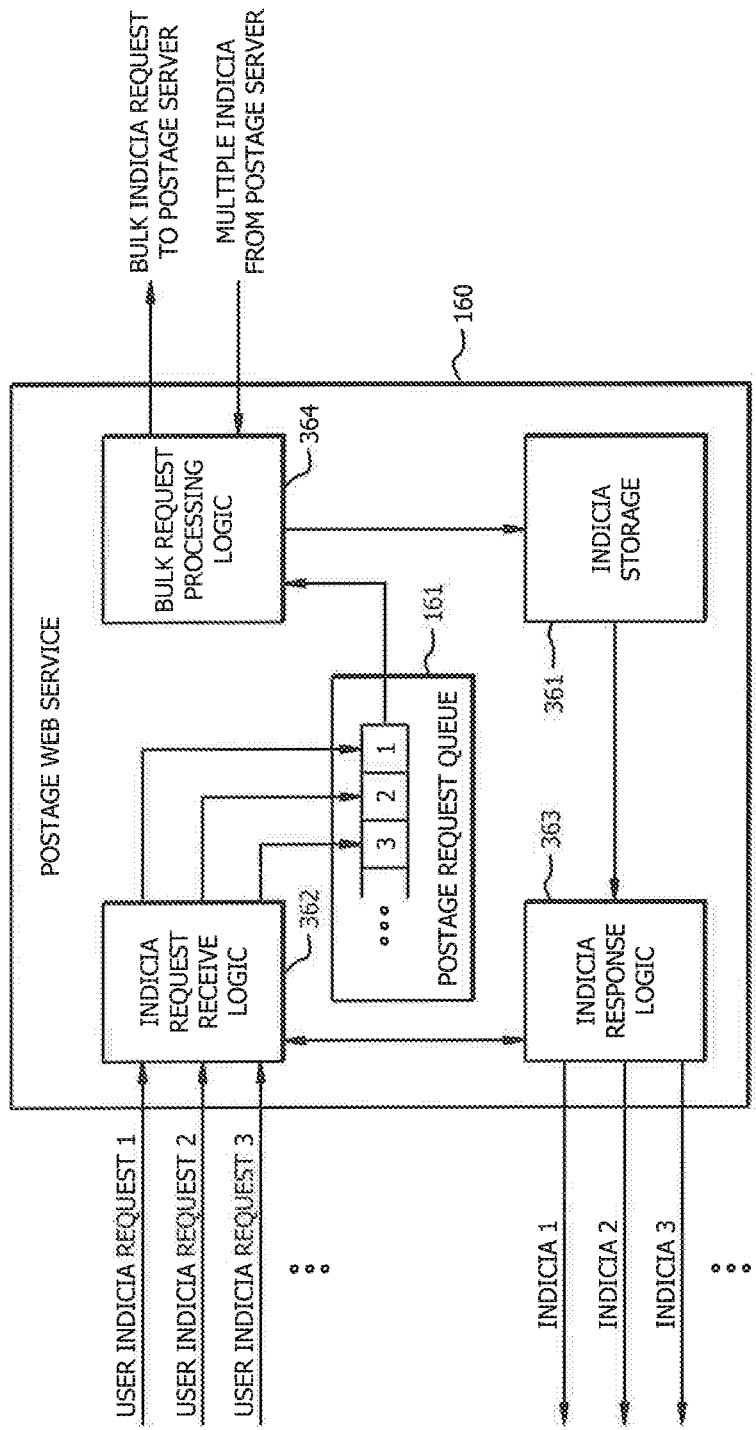
FIG. 3 shows a functional block diagram of a portion of systems operable to compose one or more bulk indicia request from multiple indicia requests according to embodiments of the present invention.

At block 212 of the illustrated embodiment, postal services system 110B gathers multiple postage indicia requests for the users and composes one or more bulk postage indicia requests. For example, as shown in the functional block diagram of FIG. 3, postage web service 160 may receive (e.g., by indicia request receive logic 362 shown in the functional block diagram of the embodiment of postage web service 160 of FIG. 3) postage indicia requests from client devices 140B-140D and store the postage indicia requests in a memory (e.g., postage request queue 161) for creating a bulk request for multiple indicia. Such bulk requests may thus consolidate multiple requests from different users into a single bulk transaction, thereby facilitating serving a plurality of independent users by the postage metering system.

It should be appreciated that logic of postage web service 160 may perform functions in addition to receiving indicia requests. For example, indicia request receive logic 362 of embodiments may utilize user identification information (e.g., user account information, user credentials (e.g., user name, password, digital certificate, etc.), and/or the like), as may be included in or in association with indicia requests, to validate the users as an authorized users of the postal services system, to identify an account or accounts from which value for the postage indicia is to be debited and/or to which value is to be charged, to identify virtual PSD information associated with the requesting users, etc. Additionally or alternatively, user identification information and/or client device information (e.g., MAC address information, IP address information, digital certificate, electronic serial number (ESN), hardware and/or software registration or serial numbers, etc., may be utilized by logic of postage web service 160 for associating indicia which is ultimately generated with the indicia request, and thus the requesting client device. For example, indicia request receive logic 362 may collect such information and provide that information to indicia response logic 363 for use in returning generated indicia to appropriate ones of client devices 140B-140D.

Continuing the operation at block 212 of the illustrated embodiment, having received indicia requests, logic (e.g., bulk request processing logic 364) of postage web service 160 may access the postage request queue and aggregate a plurality of postage indicia requests to compose a bulk request for multiple postage indicia according to embodiments of the invention. Such bulk requests for postage indicia may be composed periodically, aperiodically, etc. For example, when a threshold number of appropriate postage indicia requests have been queued, postage web service 160 may operate to compose one or more bulk postage request for the queued postage indicia requests. Additionally or alternatively, postage web service 160 may operate to compose one or more bulk postage requests for queued postage indicia requests after some predetermined period of time (e.g., once a minute, once an hour, etc.). Such periodic and aperiodic operation may be combined, such as to provide for composing one or more bulk postage indicia request if a threshold number of appropriate postage indicia requests have not been queued within some predetermined period of time.

Postage web service 160 of embodiments may operate to analyze the postage indicia requests in order to associate appropriate postage indicia requests in a same bulk postage indicia request. For example, the queued postage indicia requests may be analyzed by bulk request processing logic 364 to identify postage indicia requests having common or compatible characteristics, such as a same postage value, a same postal class, a same type of indicia, requested by users having access to a same postage meter account, and/or the like. Accordingly, a bulk postage indicia request may be comprised of a plurality of postage indicia requests sharing a same or similar characteristic, such as to facilitate or optimize operation of a crypto module in generating multiple indicia in a same secure environment session. Postage request queue 161 of embodiments may, therefore, comprise a plurality of postage request queues providing queuing of requests sharing a same or similar characteristic.

As with the embodiment discussed above with respect to FIG. 2A, a bulk postage indicia request of embodiments comprises information sufficient to generate multiple desired postage indicia for the requesting user. Accordingly, a bulk postage indicia request may include information such as postage amounts, multiple special services, mail classes, hidden postage information, insurance information, tracking numbers, etc. Moreover, bulk postage indicia requests may include user identification information (e.g., user account information, user credentials (e.g., user name, password, digital certificate, etc.), and/or the like), such as may be used to validate the user as an authorized user of the postal services system, to identify an account from which value for the postage indicia is to be debited and/or to which value is to be charged, to identify virtual PSD information associated with the requesting user, etc.

Having composed a bulk postage indicia request, in further operation at block 212 of embodiments the bulk postage indicia request of embodiments is provided to postage server 120 for processing and generation of multiple PSD. For example, assuming user authentication is successful and a suitable number of indicia requests have been received and aggregated to form a bulk postage indicia request, postage web server 160 may pass the bulk postage indicia request, or some portion thereof, to postage server 120 for initiating a session for generating multiple postage indicia.

At block 213 of the illustrated embodiment, logic of postage server 120 operates to process the bulk postage indicia request for facilitating operation by cryptocard 125 in generating multiple postage indicia in a same secure environment session. For example, postage server 120 may operate to associate the bulk postage request with particular virtual PSD information of virtual PSD information 122-124 storing postage value available to the user making the request. Additionally or alternatively, postage server 120 may provide processing of the bulk postage indicia request to provide the request, or some portion thereof, in a form usable by the PSD, such as to format the data for use by the PSD (e.g., serialize the data in a form understandable by logic of the PSD), to utilize a protocol compatible with the PSD, etc.

In operation according to embodiments, processing with respect to the bulk postage indicia request provided by logic of postal services system 110B may comprise a number of operations for facilitating postage indicia generation by cryptocard using virtual PSD information of postal database 121. For example, logic of postal services system 110B may calculate the total postage amount from the bulk postage indicia request data and determine if adequate total postage amount is available in the user PSD record for the bulk postage indicia request before acquiring a secure module (e.g., cryptocard 125) for generation of the postage indicia.

At block 214 of the illustrated embodiment a PSD bulk request (e.g., the bulk postage indicia request as processed by postal services system 110B) is provided to cryptocard 125. For example, after processing the bulk postage indicia request for facilitating operation by cryptocard 125 in generating multiple postage indicia in a same secure environment session, logic of postal services system 110B may provide the PSD bulk request to cryptocard 125 to initiate generation of the multiple postage indicia. In operation according to embodiments, providing the PSD bulk request to the cryptocard by logic of postal services system 110B may comprise a number of operations. For example, logic of postal services system 110B may operate to select a particular crypto module (e.g., cryptocard 125) for generation of the multiple postage indicia from a plurality of crypto modules (e.g., to select an available crypto module, to select a crypto module having specific capabilities, to provide load balancing among a pool of crypto modules, etc.). The selected crypto module may thereafter be locked for operation of the secure environment session to generate the multiple postage indicia.

It should be appreciated that the providing of the PSD bulk request may be done in association with providing other data to the cryptocard. For example, logic of postal services system 110B may operate to select a particular virtual PSD record for use in generating the multiple postage indicia. The virtual PSD information provided to cryptocard 125 may, for example, be selected based upon a particular service provider providing services to the users who's indicia requests are aggregated into the bulk postage indicia request and that the virtual PSD has sufficient account value associated therewith to support generation of the requested postage indicia. Additionally or alternatively, the virtual PSD information provided to cryptocard 125 may be selected based upon the available value balance of the PSD (e.g., selection of a particular virtual PSD having a lowest available value balance which is sufficient to provide the total value of the requested multiple postage indicia. The selected virtual PSD information of virtual PSD information 122-124 may be locked (e.g., to prevent its simultaneous use with respect to another crypto module, whereby value represented thereby may be consumed more than once) and the selected virtual PSD information provided to cryptocard 125 in order to configure cryptocard 125 for operation as a particular PSD.

Further, in association with the providing of the PSD bulk request to the cryptocard, logic of postal services system 110B may acquire and lock a check point record for that crypto module (e.g., from postal database 121). Such check point information may be utilized in providing an atomic transaction with respect to the generation of the multiple postage indicia. That is, if operation to generate the multiple postage indicia is interrupted or otherwise fails to complete the complete process of generating all the multiple postage indicia, and possibly logging information associated therewith, a check point record indicating a state of the PSD prior to initiating the postage indicia generation operation may be used to roll the PSD data back to its state prior to initiating the failed multiple postage indicia generation transaction. Such check point record information may be provided to cryptocard 125, such as with or in association with the virtual PSD information and/or PSD bulk request.

Having received the PSD bulk request according to flow 200B of the illustrated embodiment, cryptocard 125 operable as a PSD generates the multiple postage indicia of the PSD bulk request in a single secure environment session at block 215 of the illustrated embodiment. Here, as with the embodiment discussed above with respect to flow 200A, cryptocard 125 of embodiments is operable to load and decrypt the appropriate virtual PSD information, configure the memory (e.g., ascending register, descending register, strike count register, etc.) of the cryptocard as the corresponding PSD, generate each postage indicia of the multiple postage indicia, update appropriate PSD data (e.g., ascending register value, descending register value, strike count register value, etc.), and encrypt the virtual PSD information for offloading from the cryptocard. In operation according to embodiments, logic of cryptocard 125 may determine the number of postage indicia it is being requested to generate, determine the size of the memory for the indicia generation based on the total number of the postage requests, and generate multiple postage indicia data.

Logic of the PSD may, for example, operate to authenticate the request (e.g., as a request from a valid server or other requesting system and/or as a request from a valid user or users). Additionally or alternatively, logic of the PSD may operate to verify that sufficient value is present in the PSD for generation of the requested postage indicia. For example, the PSD logic may implement a loop in which the value for each of the multiple requested postage indicia is identified and summed to determine a total value for the requested indicia, whereby the total value may be compared to the value available from the PSD (e.g., the PSD descending register) to determine if sufficient value is present to allow generation of the multiple requested indicia. If, however, sufficient value is available, the logic of the PSD may again implement a loop to generate each of the requested postage indicia, storing the generated postage indicia data for providing to the postage server in a single response. In operation according to embodiments, the ascending and descending registers of the PSD are adjusted as each of the multiple postage indicia are generated. Additionally, a logging register of embodiments of the PSD is used to sum the value of each of the generated postage indicia to provide a total amount used with respect to logging data (e.g., used in generation of an audit indicia for logging purposes).

As previously described, cryptocard 125 of embodiments may operate to generate more than the requested multiple postage indicia when performing operation for generating multiple postage indicia in a single secure environment session. For example, logic of the cryptocard may generate logging and/or other data unique to the secure environment multiple postage indicia session. In operation according to embodiments, such logging data may include the number of indicia generated in the session, the total value of the indicia generated, the time/date of the generation session (e.g., the starting time, the ending time, or both), the starting and/or ending register values (e.g., ascending register, descending register, etc.), transaction number or other transaction identification information, meter/license number or other identification information, and the like.

At block 216 of the illustrated embodiment, cryptocard 125 may return logging or audit information for the multiple postage indicia for processing, storage, and/or reporting by postal services system 110B. For example, after the cryptocard generates postage indicia data for a multiple postage indicia request, intermediary code for the cryptocard may operate to write an audit log entry to the storage device (e.g., within postal database 121). Such audit information may comprise information regarding the number, value, type, etc. of the generated postage indicia, identification of the PSD (e.g., virtual PSD information) used to generate the postage indicia, and/or the like. Additionally or alternatively, such audit information may comprise one or more audit indicia, generated by cryptocard 125 in association with the multiple postage indicia, providing aggregated audit information (e.g., ending register values, number of postage indicia generated, identification information for each of the multiple postage indicia, etc.). Any or all of the foregoing information may be further processed, stored, and/or reported by logic of postal services system 110B. In operation according to embodiments, after such audit log information is written successfully, logic of cryptocard 125 may provide the generated postage indicia data for the multiple postage indicia, the updated virtual PSD information, and updated check point record to logic of postal services system 110B outside of the secure environment.

Accordingly, at block 217 of the illustrated embodiment of flow 200B the generated multiple postage indicia are passed from the secure environment of cryptocard 125. For example, the generated multiple postage indicia may be returned to logic of postage server 120 (e.g., bulk request processing logic 364), such as for further processing and providing to the requesting client device. It should be appreciated that information in addition to that of the multiple postage indicia may be returned from cryptocard 125 in association with the generated postage indicia. For example, cryptocard 125 may return the virtual PSD information, updated to reflect generation of the multiple postage indicia, for storage in postal database 121.

Processing of the multiple postage indicia returned from cryptocard 125 by postage web service 160 of embodiments includes assigning the generated postage indicia to the corresponding requesting client devices at block 218. For example, bulk request processing logic 364 may receive the generated indicia and provide the multiple indicia to indicia response logic 363, such as by storing the indicia to indicia storage 361 for access and processing by the indicia response logic. Indicia response logic 363 may operate to associate indicia of the multiple generated indicia with the appropriate users, user devices, and/or indicia requests, such as using information regarding the indicia requests provided by indicia request receive logic 362.

At block 219, postal services system 110B returns appropriate ones of the generated multiple postage indicia to the requesting client devices. It should be appreciated that logic of postal services system 110B may provide further processing with respect to the generated multiple postage indicia prior to its returning the generated multiple postage indicia to client device 140A. For example, postal services system 110A may provide processing of the multiple postage indicia returned by cryptocard 125 to provide the postage indicia data, or some portion thereof, in a form usable by the requesting client devices or other systems of system 100A, such as to format the data for use by client devices 140B-140D, for processing and communication by bridge server 130, and/or for efficient communication via network 150. Embodiments of postal services system 110A may provide processing to associate the appropriate postage indicia with the particular bulk postage indicia request made by respective ones of postage web apps 143C-143D in order to facilitate properly identifying the postage indicia with the operations at client devices 140B-140D for which the postage indicia was generated.

Having received the requested multiple postage indicia, client devices 140B-140D may each independently print or otherwise consume their respective indicia of the multiple postage indicia at block 220. For example, each postage web app of postage web apps 143B-143D may receive corresponding indicia data of the multiple postage indicia data and generate postage indicia image data packets (e.g., bitmap images of IBI, such as may comprise human readable information and machine readable information, such as PDF 417 or data matrix barcode) suitable for controlling an associated printer (e.g., a printer of printers 142B-142D, respectively) to print postage indicia acceptable to a postal service or other shipping service provider.

The multiple postage indicia as generated by postal services systems (e.g., postal services system 110A and/or postal services system 110B) of embodiments herein may comprise various forms and levels of completion. For example, indicia data packets suitable for use in completing generation of an acceptable postage indicium may be generated and provided to a client (e.g., postage client 141A and/or postage web apps 143B-143D) for processing and completion of the final postage indicia. Additionally or alternatively, the postage indicia data packets provided by a postal service system may comprise an IBI "light" form of indicia, whereby a reduced set of information is provided in the data packet with which the client device prints or otherwise consumes the generated indicia, while complete IBI data is generated by the PSD of the postal services system for use in authenticating and/or auditing the resulting IBI light indicia. Details with respect to the generation and use of IBI light indicia as may be utilized according to embodiments of the invention herein are shown and described in the above referenced patent application entitled "Computer-Based Value-Bearing Item Customization Security".

It should be appreciated that although the functional blocks of postage web service 160 are described above with reference to flow 200B providing operation with respect to generation of multiple indicia requested by multiple users, such functional blocks may be utilized for flow 200A providing operation with respect to generation of multiple indicia requested by a same user. For example, indicia request receive logic 362, bulk request processing logic 364, and indicia response logic 363, perhaps with supporting infrastructure such as indicia storage 361 and/or postage request queue 161, may be disposed in client device 140A (e.g., provided as part of postage client 141A) of system 100A to provide aggregation of indicia requests into a bulk postage indicia request. In one embodiment, indicia request receive logic 362 and indicia response logic 363 may interact with one or more applications (e.g., document generation software, postage metering software, etc.) to accept postage indicia requests and provide postage indicia data in response thereto.

The foregoing embodiments provide generation of multiple indicia in a single secure environment session in response to a bulk indicia request. The number of indicia that may be generated in a single secure environment session may, however, be limited (e.g., limitations may be established whereby up to 10, 25, 50, 100, 250, 500, etc., indicia may be generated in a single session). For example, the number of indicia generated in a single secure environment session may be limited by the resources (e.g., processing capabilities, memory capacity, etc.) of a PSD providing the secure environment. Additionally or alternatively, the number of indicia generated in a single secure environment session may be limited to prevent undesired operational results, such as unavailability of one or more PSD for use by other users for an excessively long period of time, facilitating practicable rollback of transactions for atomic operation of a bulk indicia request, etc. Accordingly, particularly large bulk indicia requests may be processed in a plurality of batches for generating the multiple indicia requested thereby.

Figure 4:
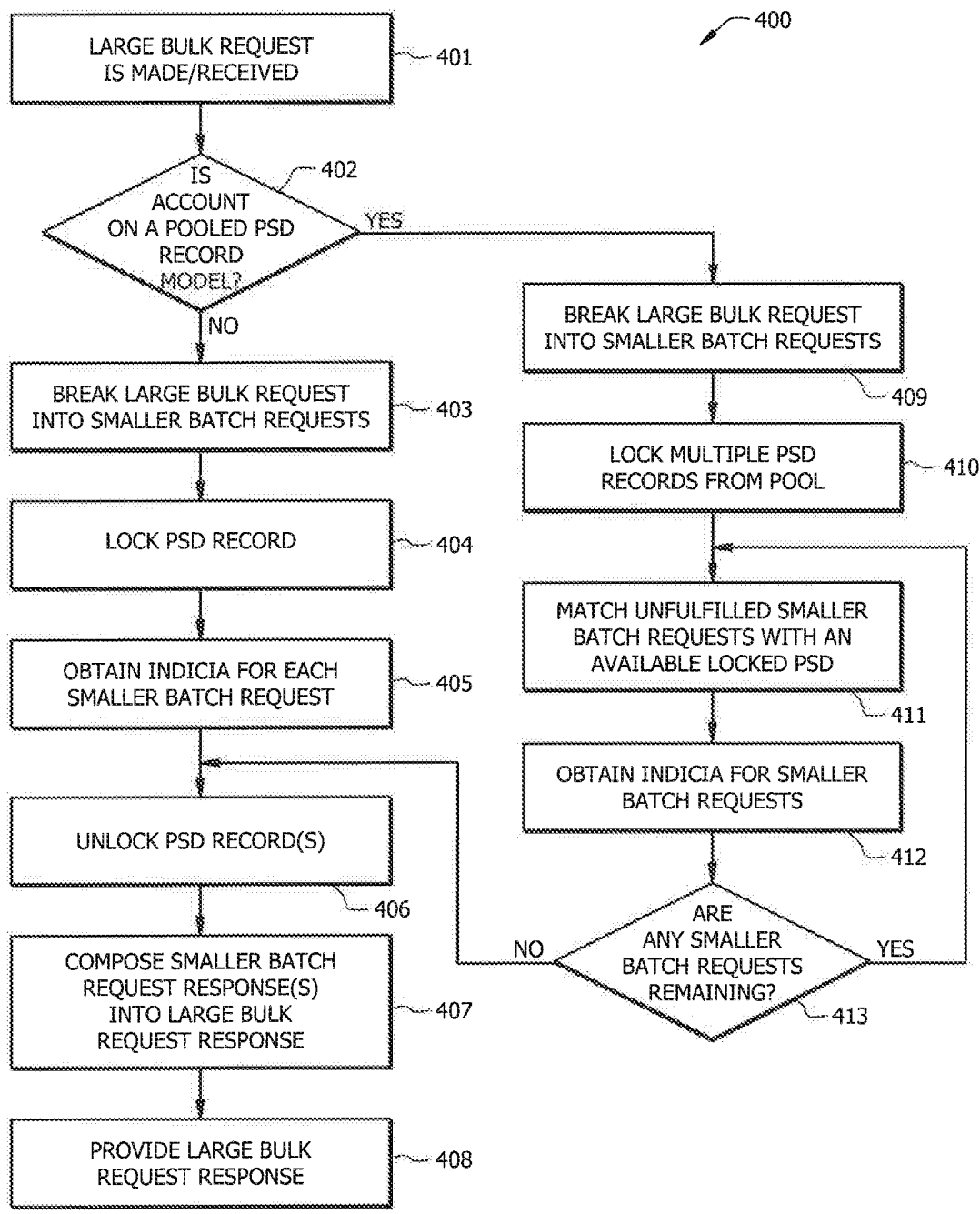
FIG. 4 shows a flow diagram of operation to provide dividing of large bulk indicia requests in a plurality of smaller batch requests.

FIG. 4 shows flow 400 of an embodiment providing operation to generate multiple indicia of a large bulk request in a plurality of smaller batches. One or more (e.g., each) such smaller batches may themselves operate to generate multiple indicia in a single secure environment session according to embodiments herein. It should be appreciated that the processes of flow 400 may be performed by a postal service system (e.g., postal services system 110A and/or 110B) of embodiments of the invention.

At block 401 of the illustrated embodiment of flow 400 a large bulk request, such as may be made by a client device or postage web service, is received by the postal services system. The large bulk request may be for multiple postage indicia for a single user (e.g., a bulk postage indicia request as utilized in flow 200A discussed above) and/or for multiple postage indicia for different users (e.g., a bulk postage indicia request as utilized in flow 200B discussed above). Irrespective of the particular users for which the multiple postage indicia are being requested, the large bulk request of embodiments is for a number of postage indicia greater (e.g., >10, 25, 50, 100, 250, 500, etc.) than a number that is to be served in a single secure environment session.

Postal services system of embodiments herein may operate to provide for generation of postage indicia using various PSD models. For example, a user or service provider serving one or more users may be provided with a single PSD from which all postage indicia for the user or service provider is to be generated. Such a model, although providing limited bandwidth for generation of postage indicia, provides a model in which a single meter balance may be managed and maintained, thereby providing a simple and relatively inexpensive postage metering solution. Alternatively, a user or service provider serving one or more users may be provided with a pool of PSDs from which postage indicia for the user or service provider is to be generated. Such a model, although providing multiple meter balances to be managed and maintained, provides a model in which improved bandwidth for generation of postage indicia is available, thereby facilitating serving multiple requests or otherwise generating multiple indicia at a time in parallel.

Accordingly, at block 402 of the illustrated embodiment a determination is made as to whether the account to be used with respect to the large bulk request is on a pooled PSD record model (e.g., multiple virtual PSDs are maintained for configuring a plurality of cryptocards for simultaneous use in association with the account). If it is determined that the account for the large bulk request is on a pooled PSD record model, processing according to the illustrated embodiment proceeds to block 409, whereby operation as described below is performed. However, if it is determined that the account for the large bulk request is not on a pooled PSD record model, processing according to the illustrated embodiment proceeds to block 403.

At block 403 the large bulk request is broken into smaller batch requests. For example, the large bulk request may be divided into two or more smaller batch requests, wherein each of the smaller batch requests comprises requests for a number of postage indicia less than or equal to a number that is to be served in a single secure environment session. The smaller batch requests may each comprise requests for an equal number of postage indicia (e.g., each smaller batch request comprising the number of postage indicia requests of the large bulk request divided by a smallest denominator which provides a resulting number of requests capable of accommodation in a single secure environment session) or for different numbers of postage indicia (e.g., one or more smaller batch requests comprising requests for a maximum number of postage indicia that can be accommodated in a single secure session and one smaller batch requests comprising requests for the remaining number of postage indicia to complete the large bulk request). The size and/or number of smaller batch requests broken out of a larger bulk request may be determined based upon a number of factors, such as to provide load balancing across available PSDs and/or postal servers, to provide requests having a number of requested postage indicia efficiently served by a PSD in a single secure environment session, to provide smaller request having a maximum number of postage indicia requests serviceable by a PSD in a single secure environment, etc.

The virtual PSD record for the virtual PSD to be used with respect to the account serving the large bulk request is preferably locked at block 404 (e.g., to prevent its simultaneous use with respect to another crypto module, whereby value represented thereby may be consumed more than once) and the selected virtual PSD information provided to a cryptocard in order to configure the cryptocard for operation as a particular PSD. The cryptocard to which the virtual PSD information is provided is preferably locked to prevent attempts to simultaneously configure the cryptocard as another/different PSD in response to another request. Additionally, a check point record for that crypto module may be acquired and locked, according to embodiments of the invention.

At block 405 of the illustrated embodiment the postage indicia for each of the smaller batch requests are generated and obtained. For example, each of the smaller batch requests may be provided to the PSD (e.g., as discussed above with respect to block 204 of flow 200A) serially for generation of the postage indicia (e.g., as discussed above with respect to block 205 of flow 200A or block 215 of flow 200B). The resulting generated postage indicia may then be received from the PSD after each such smaller batch request is processed.

Having generated the postage indicia of all of the smaller batch requests, the updated virtual PSD record is offloaded from the PSD and unlocked at block 406. Additionally, the cryptocard is preferably unlocked and the check point record is updated and unlocked to thereby make the cryptocard available for use in serving a different request.

At block 407 of the illustrated embodiment the postage indicia data returned in response to each of the smaller batch requests of the large bulk request are aggregated into a large bulk request response. For example, the multiple postage indicia data for each of the smaller batch requests may be processed to compose a single response to the large bulk request from which the smaller batch requests were divided. Thereafter, the large bulk request response may be provided to a node (e.g., postage client 141A or postage web service 160) which made the large bulk request, at block 408.

If, however, it was determined at block 402 that the account for the large bulk request is on a pooled PSD record model, processing according to the illustrated embodiment proceeds to block 409 wherein the large bulk request is broken into smaller batch requests. For example, the large bulk request may be divided into two or more smaller batch requests as discussed with respect to operation at block 403 above.

One or more virtual PSD record of the pool of virtual PSDs to be used with respect to the account serving the large bulk request are preferably locked at block 410 (e.g., to prevent its simultaneous use with respect to another crypto module, whereby value represented thereby may be consumed more than once) and the selected virtual PSD information provided to a corresponding number of cryptocards in order to configure the cryptocards each for operation as a particular PSD. The number of virtual PSDs to be utilized in serving the smaller batch requests, and thus the number of virtual PSD records selected, may dependent on the number of PSDs in the pool, the number of PSDs currently not otherwise in use, the number of smaller batch requests resulting from the large bulk request, a number of PSDs determined to facilitate generation of the multiple postage indicia within a satisfactory amount of time, etc. The cryptocards to which the virtual PSD information is provided are preferably locked to prevent attempts to simultaneously configure the cryptocards as another/different PSD in response to another request. Additionally, check point records for those crypto modules may be acquired and locked, according to embodiments of the invention.

Having configured the PSDs for serving the postage indicia requests, the particular ones of the unfulfilled smaller batch requests are assigned to available ones of the PSDs for operation to generate postage indicia at block 411. For example, assuming the large bulk request resulted in 3 smaller batch requests and the account associated with the postage indicia requests (e.g., the user's account, the service provider's account, etc.) then has 2 PSDs which are not otherwise in use, 2 virtual PSDs may be utilized to provide PSDs for generating the postage indicia. Accordingly, in an initial pass of operation at block 411, 2 of the smaller batch requests may be matched with the 2 PSDs for postage indicia generation, while the third smaller batch requests remains queued for matching to a PSD as one becomes available in a subsequent iteration.

At block 412 of the illustrated embodiment the postage indicia for each of the smaller batch requests currently matched to a PSD are generated and obtained. For example, each of the matched smaller batch requests may be provided to their respective PSDs (e.g., as discussed above with respect to block 204 of flow 200A or block 215 of flow 200B) in parallel for generation of the postage indicia (e.g., as discussed above with respect to block 205 of flow 200A). It should be appreciated that operation of the multiple PSDs serving the different smaller batch requests may be asynchronous, whereby such operation may begin and/or end at different times. Nevertheless, the resulting generated postage indicia may be received from the PSD after each such smaller batch request is processed.

Having received the generated postage indicia from one or more of the PSDs, a determination is made at block 413 of the illustrated embodiment as to whether any smaller batch requests remain to be served. If one or more smaller batch requests remain to be served, processing according to the illustrated embodiment returns to block 411 whereby some or all such unfulfilled smaller batch requests are matched with an available PSD. If, however, all smaller batch requests have been served (i.e., the postage indicia for each smaller batch request of the large bulk request have been obtained), processing according to the illustrated embodiment proceeds to blocks 406 et seq. whereby the PSD records are unlocked, the smaller batch requests responses are composed into a large bulk request response, and the large bulk request response is provided to the node (e.g., postage client 141A or postage web service 160) which made the large bulk request.

It should be appreciated that, although embodiments have been described above whereby a single smaller batch request or a single bulk postage indicia request are served by a PSD (e.g., a cryptocard configured with appropriate virtual PSD information) at any one time, where the processor of a PSD supports multi-threading embodiments may operate to use such PSDs to serve more than one such request at a time. For example, where cryptocard 125 supports multi-threading (e.g., using the 4765 cryptographic coprocessor available from International Business Machines Corporation), multiple virtual PSD records may be provided thereto in order to serve a corresponding number of smaller batch requests or bulk postage indicia requests in parallel according to embodiments of the invention.

From the forgoing it can be appreciated that the bulk requests of embodiments herein may be utilized to provide improved performance and an enhanced user experience by reducing the round trip calls from the client to the server of embodiments. Moreover, in many configurations the postal services system communicates with the crypto module using a peripheral component interconnect express (PCIE) bus or similar interconnect bus, rather than a direct memory access (DMA) or similar high speed bus, and thus the bulk and/or batch requests of embodiments herein facilitate improved performance with respect to the internal operation of the postal services system requesting and obtaining the indicia. Further, the bulk and batch requests made with respect to a crypto module of embodiments are atomic, whereby rollback of the full transaction upon a failure to successfully generate one indicia of the bulk/batch request is simplified (i.e., previously generated indicia of the bulk/batch request have not been passed serially from the secure environment and thus may be included in the rollback of the register values rather than voided and processed for refund externally from the secure environment).

It should be appreciated that the bulk requests for multiple indicia facilitated by embodiments of the present invention may be utilized in a variety of use situations. For example, a use scenario for the "single user" bulk request (here single user meaning a single enterprise, although multiple users within that enterprise may in fact be sourcing requests) may comprise a fulfillment warehouse situation. In such a warehouse situation, traditionally items may be picked and placed in shipping containers and an associated shipping label (e.g., containing postage value or prepaid value for shipping services) generated for each container as that container is processed serially on the fulfillment line. If generation of one such shipping label were to fail, the fulfillment line is delayed while the problem is resolved. However, in operation according to embodiments herein, a single shipping label bulk request may be made for a plurality of shipping labels (e.g., all shipping labels for a shipment processing period, such as a fraction of an hour, an hour, a fraction of a day, a day, etc.), whereby the transaction is atomic (i.e., either all requested shipping labels are returned or no shipping labels are returned). The fulfillment workflow may thus be revised, for example, such that all the shipping labels are generated in advance with the knowledge that all requested shipping labels will complete if any such shipping labels complete the generation process. Once all the indicia data for the shipping labels is generated, all such shipping labels may be printed. Having successfully generated all the indicia data to be generated for a shipment processing period, problems that may otherwise result from failures or delays in generating shipping labels are eliminated with respect to further fulfillment processing. With this model the fulfillment process may be performed faster and more reliably knowing that all the shipping label indicia generation for all the packages to be fulfilled will be/was successful.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a database storing a plurality of crypto module configuration records, wherein each crypto module configuration record of the plurality of crypto module configuration records comprises information operable to configure secure processor-based crypto modules as corresponding secure processor-based value bearing indicia generation crypto modules; and
a secure processor-based crypto module having a processor and a memory disposed within a secure environment, wherein the secure processor-based crypto module comprises logic executable by the secure processor-based crypto module to:
configure the secure processor-based crypto module as a security device for a particular value account based on data of a crypto module configuration record of the plurality of crypto module configuration records stored in the database;
perform value bearing indicia generation in which multiple value bearing indicia data are generated in a single secure environment session using the crypto module configuration record;
update the crypto module configuration record based on the multiple value bearing indicia data generated in the single secure environment session; and
offload the updated crypto module configuration record from the secure environment to the database.

2. The system of claim 1, wherein the single secure environment session either successfully completes all operations of a set of operations by the logic for generation of the multiple value bearing indicia data or rolls data of the crypto module configuration record back to its state prior to initiating the single secure environment session.

3. The system of claim 1, wherein a set of operations performed in the single secure environment session by the logic executable by the secure processor-based crypto module includes an operation to receive a request for the multiple value bearing indicia data, and an operation to output the generated multiple value bearing indicia data.

4. The system of claim 1, further comprising:
an indicia generation server operatively coupled to the secure processor-based crypto module and in communication with the database, wherein logic executed by the indicia generation server initiates the generation of the multiple value bearing indicia data in the single secure environment session by the secure processor-based crypto module by passing a single request for the multiple value bearing indicia data to the secure processor-based crypto module and receives the generated multiple value bearing indicia data returned by the secure processor-based crypto module.

5. The system of claim 4, further comprising:
a postage web service in communication with the indicia generation server, wherein the postage web service is configured to receive a plurality of separate requests for value bearing indicia and to provide a bulk value bearing indicia request to the indicia generation server to generate the multiple value bearing indicia data in the single secure environment session.

6. The system of claim 1, further comprising:
an indicia generation client configured to request generation of value bearing indicia, wherein the multiple value bearing indicia data generated in the single secure environment session are generated in response to a bulk indicia request for the multiple value bearing indicia data made by the indicia generation client.

7. The system of claim 1, further comprising:
a plurality of indicia generation clients configured to request generation of value bearing indicia, wherein the multiple value bearing indicia data generated in the single secure environment session are generated in response to a bulk indicia request formed from aggregating requests made by the plurality of indicia generation clients.

8. The system of claim 1, wherein the value bearing indicia are postage indicia, and wherein the database comprises:
a postal database storing a plurality of virtual postal security device (PSD) records, wherein each virtual PSD record of the plurality of virtual PSD records comprises information operable to configure the secure processor-based crypto module as a corresponding PSD having a postage value represented therein, wherein the multiple value bearing indicia data generated in the single secure environment session are generated using a same PSD configuration of the crypto module.

9. A system comprising:
a database storing a plurality of crypto module configuration records, wherein each crypto module configuration record of the plurality of crypto module configuration records comprises information operable to configure secure processor-based crypto modules as corresponding secure processor-based value bearing indicia generation crypto modules; and
a secure processor-based crypto module having a processor and a memory disposed within a secure environment, wherein the secure processor-based crypto module comprises logic executable by the secure processor-based crypto module to:
configure the secure processor-based crypto module as a security device for a particular value account based on data of a crypto module configuration record of the plurality of crypto module configuration records stored in the database;
perform a set of operations to generate multiple value bearing indicia data in a single secure environment session in response to a request to generate the multiple value bearing indicia data, the set of operations comprising:
generating the multiple value bearing indicia data within the secure environment of the secure processor-based crypto module using data of the crypto module configuration record;
updating the data of the crypto module configuration record to reflect generation of the multiple value bearing indicia data;
outputting the generated multiple value bearing indicia data; and
offloading the crypto module configuration record having the updated data from the secure environment to the database.

10. The system of claim 9, wherein the single secure environment session either successfully completes all operations of a set of operations by the logic for generation of the multiple value bearing indicia data or rolls data of the crypto module configuration record back to its state prior to initiating the single secure environment session.

11. The system of claim 9, further comprising:
an indicia generation server operatively coupled to the secure processor-based crypto module and in communication with the database, wherein logic executed by the indicia generation server initiates generation of the multiple value bearing indicia data in the single secure environment session by the secure processor-based crypto module by passing a single request for the multiple value bearing indicia data to the secure processor-based crypto module and receives the generated multiple value bearing indicia data returned by the secure processor-based crypto module.

12. The system of claim 11, further comprising:
a postage web service in communication with the indicia generation server, wherein the postage web service is configured to receive a plurality of separate requests for value bearing indicia and to provide a bulk value bearing indicia request to the indicia generation server to generate the multiple value bearing indicia data in the single secure environment session.

13. The system of claim 9, further comprising:
an indicia generation client configured to request generation of value bearing indicia, wherein the multiple value bearing indicia data generated in the single secure environment session are generated in response to a bulk indicia request for the multiple value bearing indicia data made by the indicia generation client.

14. The system of claim 9, further comprising:
a plurality of indicia generation clients configured to request generation of value bearing indicia, wherein the multiple value bearing indicia data generated in the single secure environment session are generated in response to a bulk indicia request formed from aggregating requests made by the plurality of indicia generation clients.

15. The system of claim 9, wherein the value bearing indicia are postage indicia, and wherein the database comprises:
a postal database storing a plurality of virtual postal security device (PSD) records, wherein each virtual PSD record of the plurality of virtual PSD records comprises information operable to configure the secure processor-based crypto module as a corresponding PSD having a postage value represented therein, wherein the multiple value bearing indicia data generated in the single secure environment session are generated using a same PSD configuration of the crypto module.

16. A system comprising:
- a database storing a plurality of crypto module configuration records, wherein each crypto module configuration record of the plurality of crypto module configuration records comprises information operable to configure secure processor-based crypto modules as corresponding secure processor-based value bearing indicia generation crypto modules;
- a secure processor-based crypto module having a processor and a memory disposed within a secure environment, wherein the secure processor-based crypto module comprises logic executable by the secure processor-based crypto module to:
  - perform value bearing indicia generation in which multiple value bearing indicia data in a single secure environment session using a crypto module configuration record of the plurality of crypto module configuration records loaded in the memory, wherein the single secure environment session either successfully completes all operations of a set of operations by the logic for generation of the multiple value bearing indicia data or rolls data of the crypto module configuration record back to its state prior to initiating the single secure environment session; and
  - update the crypto module configuration record stored at the database based on the multiple value bearing indicia data upon successful completion of the set of operations; and
- an indicia generation server operatively coupled to the secure processor-based crypto module and in communication with the database, wherein logic executed by the indicia generation server initiates the generation of the multiple value bearing indicia data in the single secure environment session by the secure processor-based crypto module by passing a single request for the multiple value bearing indicia data to the secure processor-based crypto module and receives the generated multiple value bearing indicia data returned by the secure processor-based crypto module.

17. The system of claim 16, wherein the logic executed by the secure processor-based crypto module configures the secure processor-based crypto module as a security device for a particular value account using data of the crypto module configuration record.

18. The system of claim 16, wherein the set of operations performed in the single secure environment session by the logic executed by the secure processor-based crypto module include an operation to receive a request for the multiple value bearing indicia data, operation to generate the multiple value bearing indicia data within the secure environment of the secure processor-based crypto module using data of the crypto module configuration record, an operation to output the generated multiple value bearing indicia data, and an operation to offload the updated crypto module configuration record from the secure environment to the database.

19. The system of claim 16, further comprising:
- an indicia generation client configured to request generation of value bearing indicia from the indicia generation server, wherein the multiple value bearing indicia data generated in the single secure environment session are generated in response to a bulk indicia request for the multiple value bearing indicia data made by the indicia generation client.

20. The system of claim 16, further comprising:
- a plurality of indicia generation clients configured to request generation of value bearing indicia from the indicia generation server, wherein the multiple value bearing indicia data generated in the single secure environment session are generated in response to a bulk indicia request formed from aggregating requests made by the plurality of indicia generation clients.

21. The system of claim 16, wherein the indicia generation server comprises a postage server and the value bearing indicia are postage indicia, and wherein the database comprises:
- a postal database storing a plurality of virtual postal security device (PSD) records, wherein each virtual PSD record of the plurality of virtual PSD records comprises information operable to configure the secure processor-based crypto module as a corresponding PSD having a postage value represented therein, wherein the multiple value bearing indicia data generated in the single secure environment session are generated using a same PSD configuration of the crypto module.

22. The system of claim 21, further comprising:
- a postage web service in communication with the postage server, wherein the postage web service is configured to receive a plurality of separate requests for postage indicia and to provide a bulk postage indicia request to the postage server to generate the multiple value bearing indicia data in the single secure environment session.

23. The system of claim 22, wherein the postage web service comprises:
- indicia request receive logic configured to receive the plurality of separate requests;
- a postage request queue configured to store received ones of the plurality of separate requests;
- bulk request processing logic configured to aggregate selected ones of the plurality of separate requests stored in the postage request queue into the bulk postage indicia request and configured to obtain and store postage indicia data of the generated multiple value bearing indicia data; and
- indicia response logic configured to assign appropriate postage indicia data of the stored postage indicia data of the generated multiple value bearing indicia data to corresponding requesting clients.

* * * * *